(12) United States Patent
Weyandt

(10) Patent No.: US 8,919,335 B2
(45) Date of Patent: Dec. 30, 2014

(54) PORTABLE COOKING APPARATUS

(76) Inventor: Christopher D. Weyandt, St. Paul, MN (US)

( * ) Notice: Subject to any disclaimer, the term of this patent is extended or adjusted under 35 U.S.C. 154(b) by 31 days.

(21) Appl. No.: 13/453,764

(22) Filed: Apr. 23, 2012

(65) Prior Publication Data

US 2013/0081607 A1 Apr. 4, 2013

Related U.S. Application Data

(60) Provisional application No. 61/541,817, filed on Sep. 30, 2011.

(51) Int. Cl.
| | |
|---|---|
| *F24B 3/00* | (2006.01) |
| *A47J 37/07* | (2006.01) |
| *A47J 37/00* | (2006.01) |
| *F24C 3/00* | (2006.01) |
| *F23H 13/00* | (2006.01) |
| *A47J 37/08* | (2006.01) |
| *A47J 33/00* | (2006.01) |

(52) U.S. Cl.
CPC .................................. *A47J 33/00* (2013.01)
USPC ............ 126/29; 126/9 B; 126/9 R; 126/25 R; 126/39 D; 126/41 R; 126/154; 99/393; 99/450

(58) Field of Classification Search
USPC ...... 126/9 B, 9 R, 25 R, 29, 39 D, 41 R, 154; 99/393, 450
See application file for complete search history.

(56) References Cited

U.S. PATENT DOCUMENTS

| | | | |
|---|---|---|---|
| 1,050,113 A | 1/1913 | Eichelkraut | |
| 1,126,220 A | 1/1915 | Jackson | |
| 1,273,840 A | 7/1918 | Fassett | |
| 1,474,646 A | 11/1923 | Steen | |
| 1,879,837 A | 9/1932 | Bierlich | |
| 2,058,836 A | 10/1936 | Silver | |
| 2,335,020 A | 11/1943 | Nehrich | |
| 2,631,579 A | 3/1953 | Metzger | |
| 2,965,097 A | 12/1960 | Clark, Jr. | |
| 3,109,420 A | * 11/1963 | Ott et al. ........................ | 126/9 R |
| 3,523,396 A | * 8/1970 | Martinus ......................... | 52/668 |
| 3,641,922 A | 2/1972 | Nachazel et al. | |
| 3,841,299 A | 10/1974 | Tomita | |

(Continued)

OTHER PUBLICATIONS

"180 Stove," www.180tack.com/180stove.htm, available at least as early as 2011 (3 pages).

(Continued)

*Primary Examiner* — Kenneth Rinehart
*Assistant Examiner* — William Corboy
(74) *Attorney, Agent, or Firm* — Griffiths & Seaton PLLC; JoAnn M. Seaton

(57) ABSTRACT

A portable cooking apparatus includes a plurality of panels temporarily coupled to each other and a plurality of rods. Each panel includes a top edge and a bottom edge opposite the top edge. At least two of the plurality of panels each include a plurality of slits. Each slit of the plurality of slits extends from the top edge of a panel toward a bottom edge thereof. The plurality of rods removably extend between two panels of the plurality of panels, each rod of the plurality of rods being inserted into a first slit of the plurality of slits formed in one of the two panels and a second slit of the plurality of slits formed in another of the two panels.

24 Claims, 24 Drawing Sheets

(56) References Cited

U.S. PATENT DOCUMENTS

| | | |
|---|---|---|
| 4,492,215 A | 1/1985 | DiGianvittorio |
| 4,684,094 A | 8/1987 | Everett |
| 4,794,906 A | 1/1989 | Longley, Jr. |
| 4,971,045 A | 11/1990 | Probst |
| 5,105,726 A | 4/1992 | Lisker |
| 5,503,138 A | 4/1996 | Chang |
| D423,867 S | 5/2000 | Cael et al. |
| 6,425,387 B1 | 7/2002 | Rohback, Jr. |
| 6,439,111 B1 * | 8/2002 | Lu ................................. 99/449 |
| D468,959 S | 1/2003 | Rohback, Jr. |
| 6,509,549 B1 * | 1/2003 | Chasen et al. ............ 219/386 |
| D476,403 S | 6/2003 | Goodrich |
| 6,851,419 B2 | 2/2005 | Reiner |
| 6,883,512 B2 * | 4/2005 | Esposito .................. 126/9 R |
| 6,910,475 B2 | 6/2005 | Zelek et al. |
| D546,114 S | 7/2007 | Reiner |
| D627,591 S | 11/2010 | Wade |
| 2008/0087176 A1 | 4/2008 | Quyyeumi |

OTHER PUBLICATIONS

"EZ Roll Up Grills," www.arctic-fox.com/sitepages/pid67.php, available at least as early as Feb. 12, 2010 per www.internetarchive.org (5 pages).

PCT/US12/85040 International Search Report, mailed Jan. 17, 2013 (7 pages).

* cited by examiner

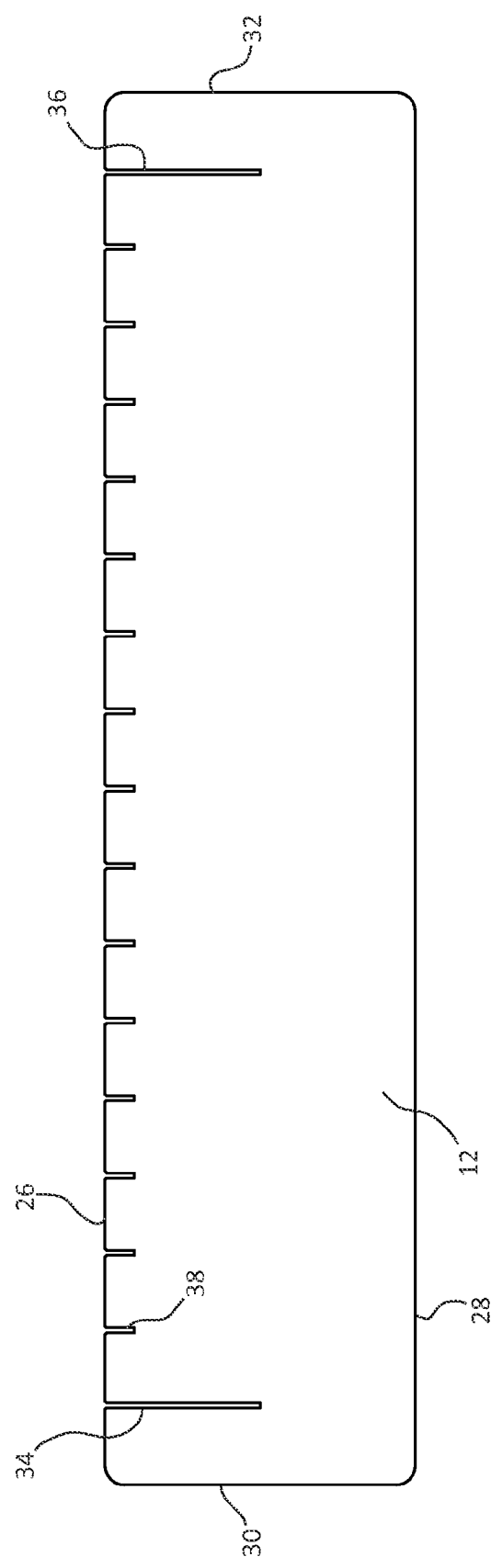

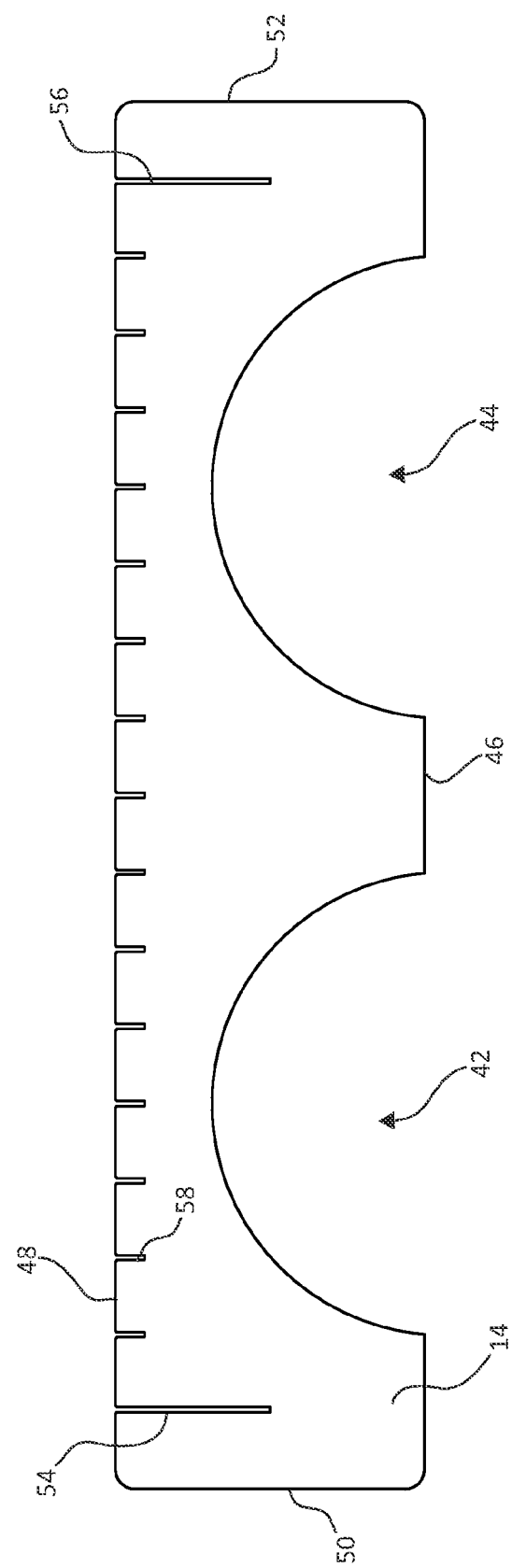

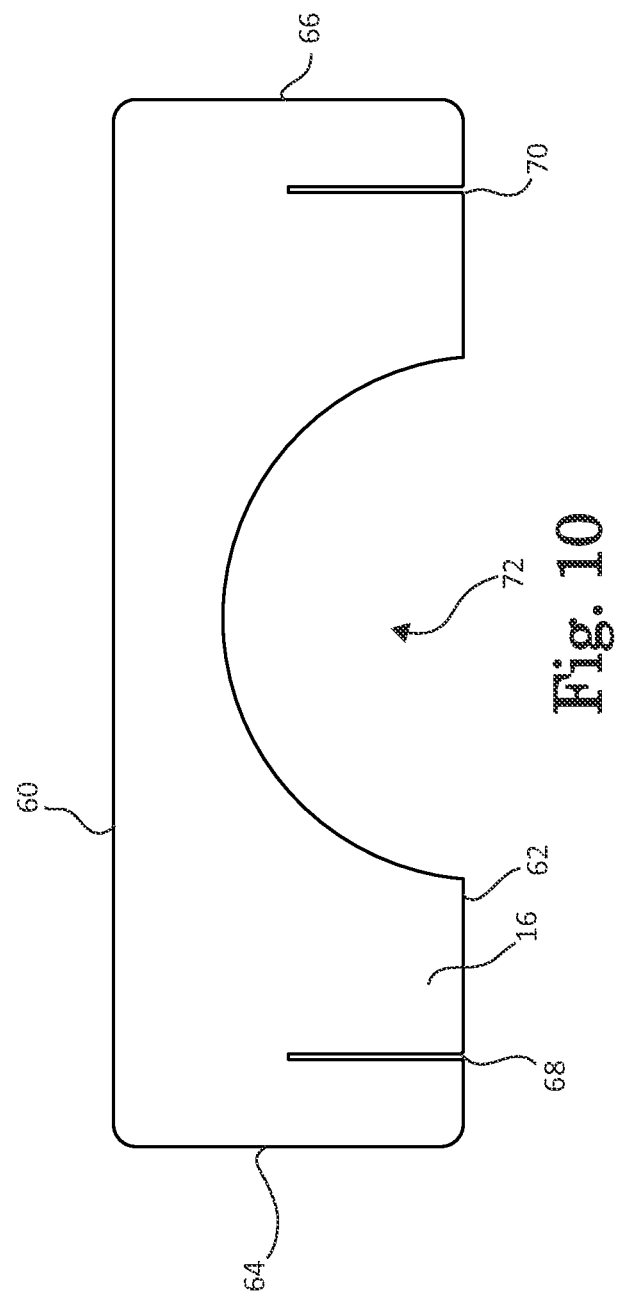

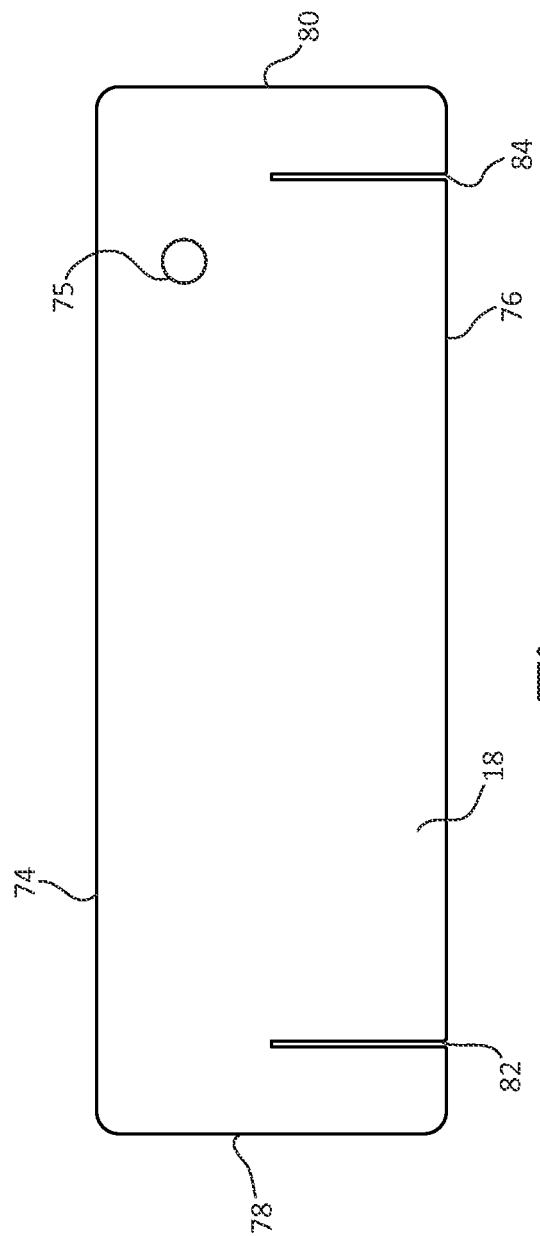

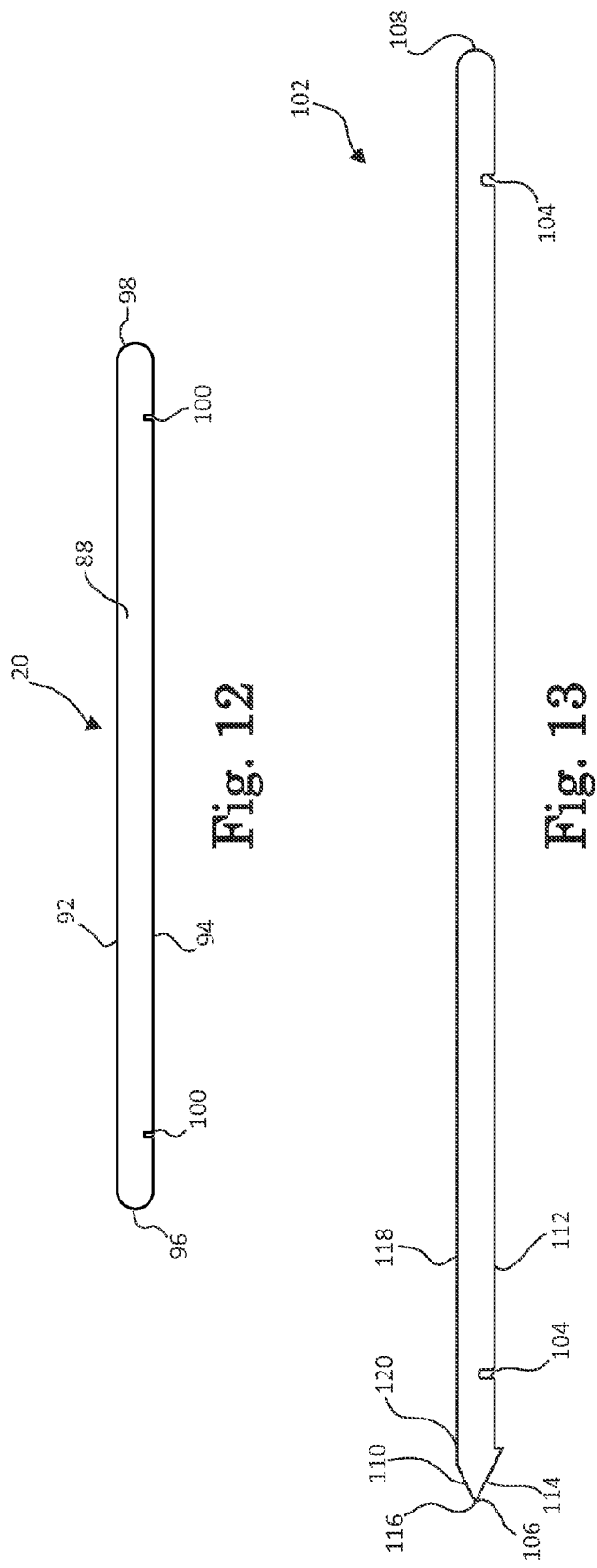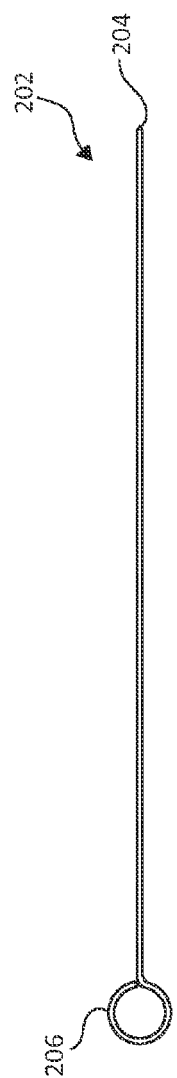

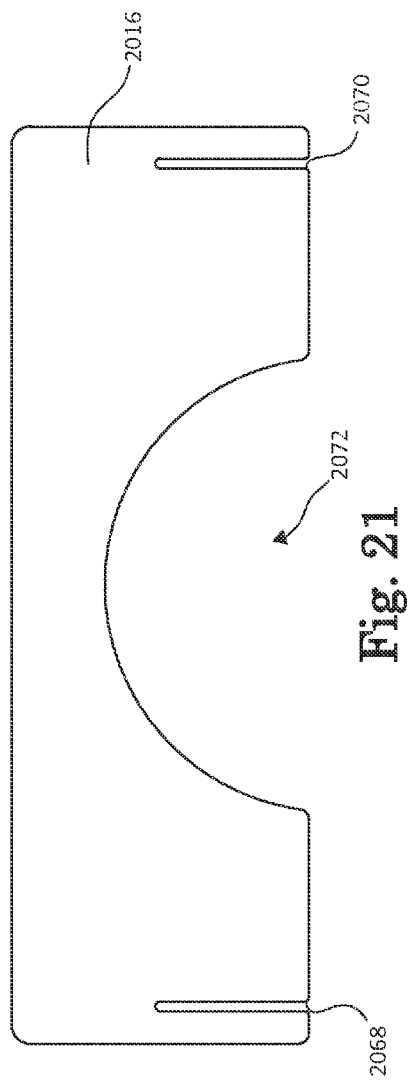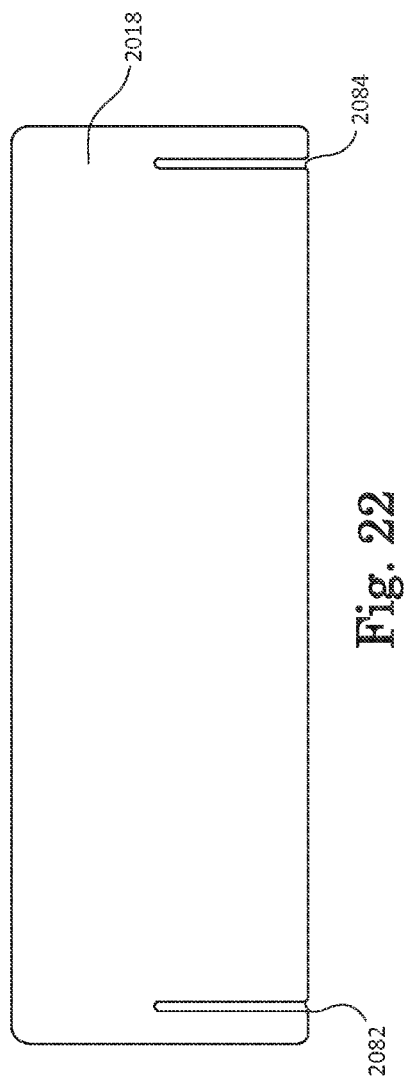

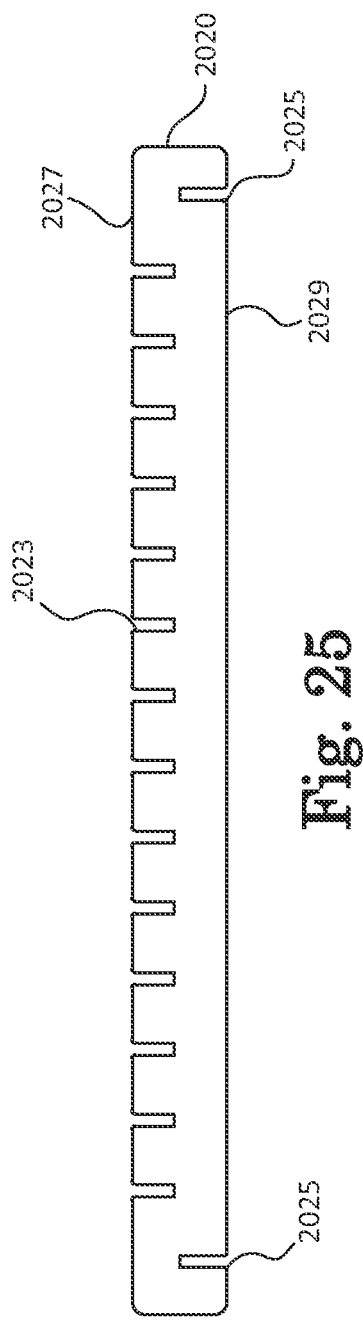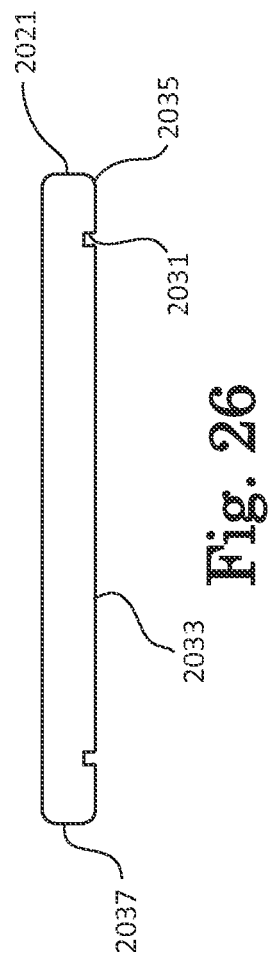

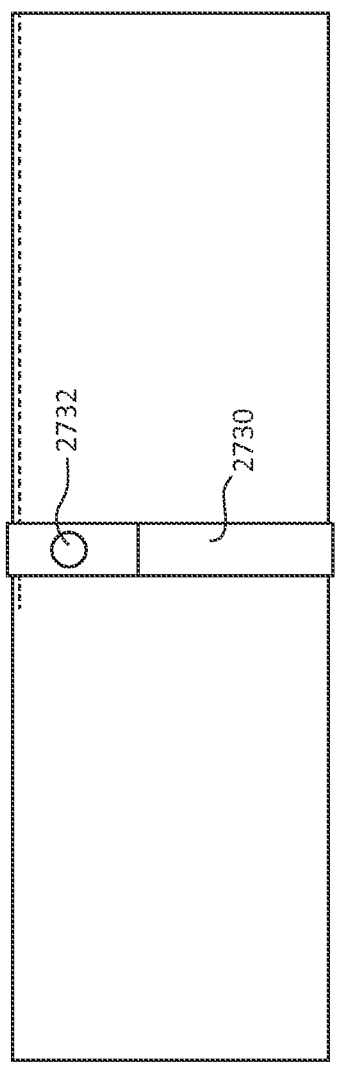

PORTABLE COOKING APPARATUS

CROSS REFERENCE TO RELATED APPLICATION

This non-provisional utility application is related to and claims priority under 35 U.S.C. §119(e) to U.S. Provisional Application No. 61/541,817, filed Sep. 30, 2011, which is incorporated herein by reference.

BACKGROUND OF THE INVENTION

Outdoor cooking is one of many techniques for preparing foods. Outdoor fires, such as campfires, can be built to heat or cook foods in a pot, or can be used as a heat source for spit roasting or grilling. Likewise, gas tanks alternatively can be used in conjunction with cooking equipment for grilling, barbecuing, and/or otherwise heating foods for consumption.

Many times, outdoor cooking is coupled with a recreational activity that is enjoyed away from the comforts of one's home. For example, outdoor cooking typically is practiced during an activity that spans several hours, such as camping, hiking, tailgating, and the like. In many cases, preparations for these extended types of recreational activity include packing equipment in a backpack or other type of sack, and physically wearing the equipment from one location to another.

SUMMARY OF THE INVENTION

One aspect of the present invention relates to a portable cooking apparatus or grill. The portable cooking apparatus includes a plurality of panels temporarily coupled to each other and a plurality of rods. Each panel includes a top edge and a bottom edge opposite the top edge. At least two of the plurality of panels each include a plurality of slits. Each slit of the plurality of slits extends from the top edge of a panel toward a bottom edge thereof. The plurality of rods removably extend between two panels of the plurality of panels, each rod of the plurality of rods being inserted into a first slit of the plurality of slits formed in one of the two panels and a second slit of the plurality of slits formed in another of the two panels. Other embodiments, methods, and related apparatus are also disclosed.

BRIEF DESCRIPTION OF THE DRAWINGS

Embodiments of the invention will be described with respect to the figures, in which like reference numerals denote like elements, and in which:

FIG. 8 is a front view illustration of a front panel of the portable cooking device of FIG. 1, according to one embodiment of the present invention.

FIG. 9 is a front view illustration of a rear panel of the portable cooking device of FIG. 1, according to one embodiment of the present invention.

FIG. 10 is front view illustration of a right side panel of the portable cooking device of FIG. 1, according to one embodiment of the present invention.

FIG. 11 is front view illustration of a left side panel of the portable cooking device of FIG. 1, according to one embodiment of the present invention.

FIG. 12 is a front view illustration of a rod of the portable cooking device of FIG. 1, according to one embodiment of the present invention.

FIG. 13 is a front view illustration of a rod of the portable cooking device for use with the portable cooking device of FIG. 1, according to one embodiment of the present invention.

FIG. 14 is a front view illustration of skewer for use with the portable cooking device of FIG. 1, according to one embodiment of the present invention.

FIG. 21 is a front view illustration of a right side panel of the portable cooking device of FIG. 20, according to one embodiment of the present invention.

FIG. 22 is a front view illustration of a left side panel of the portable cooking device of FIG. 20, according to one embodiment of the present invention.

FIG. 25 is a front view illustration of a slat of the portable cooking device of FIG. 20, according to one embodiment of the present invention.

FIG. 26 is a front view illustration of a crosspiece of the portable cooking device of FIG. 20, according to one embodiment of the present invention.

FIG. 29 is a side view illustration of the carrying case of FIG. 27 in a closed configuration, according to one embodiment of the present invention.

DETAILED DESCRIPTION

Figure 1:
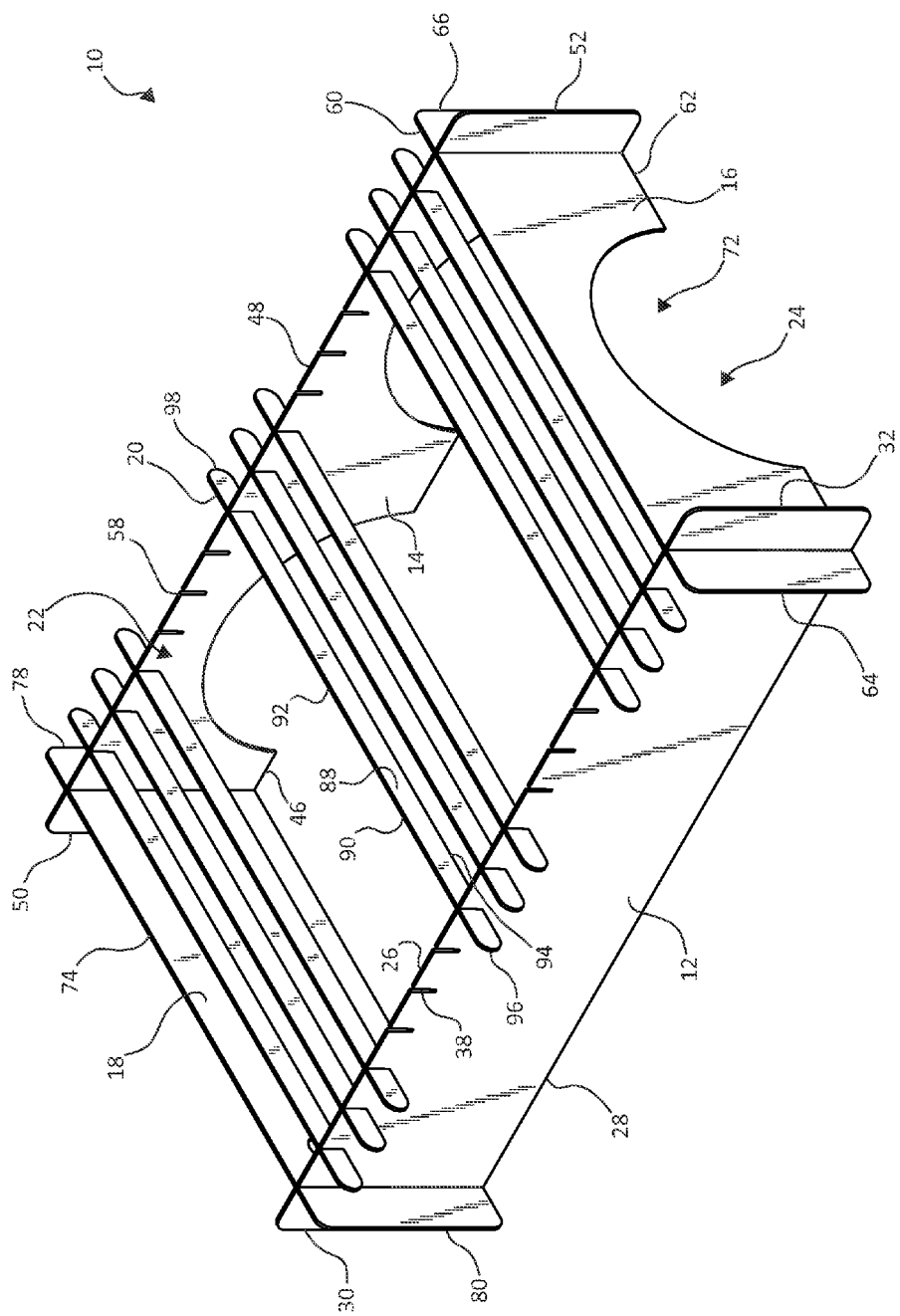
FIG. 1 is a front, perspective view illustration of a portable cooking device including slats, according to one embodiment of the present invention.
Figure 2:
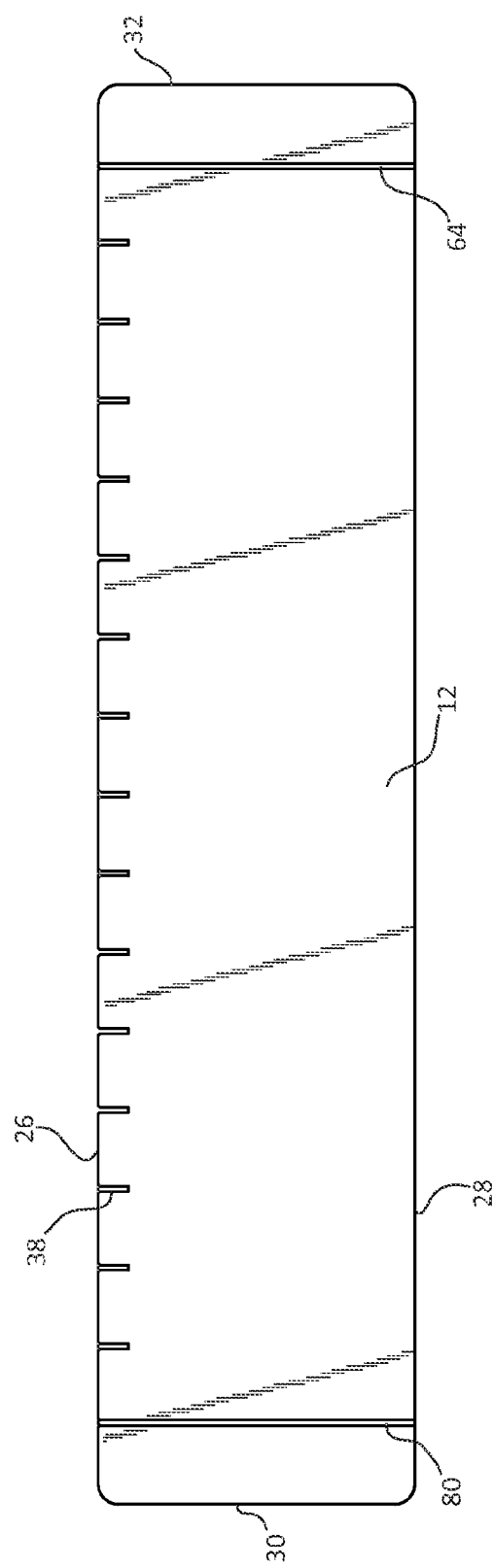
FIG. 2 is a front view illustration of the portable cooking device of FIG. 1, according to one embodiment of the present invention.
Figure 3:
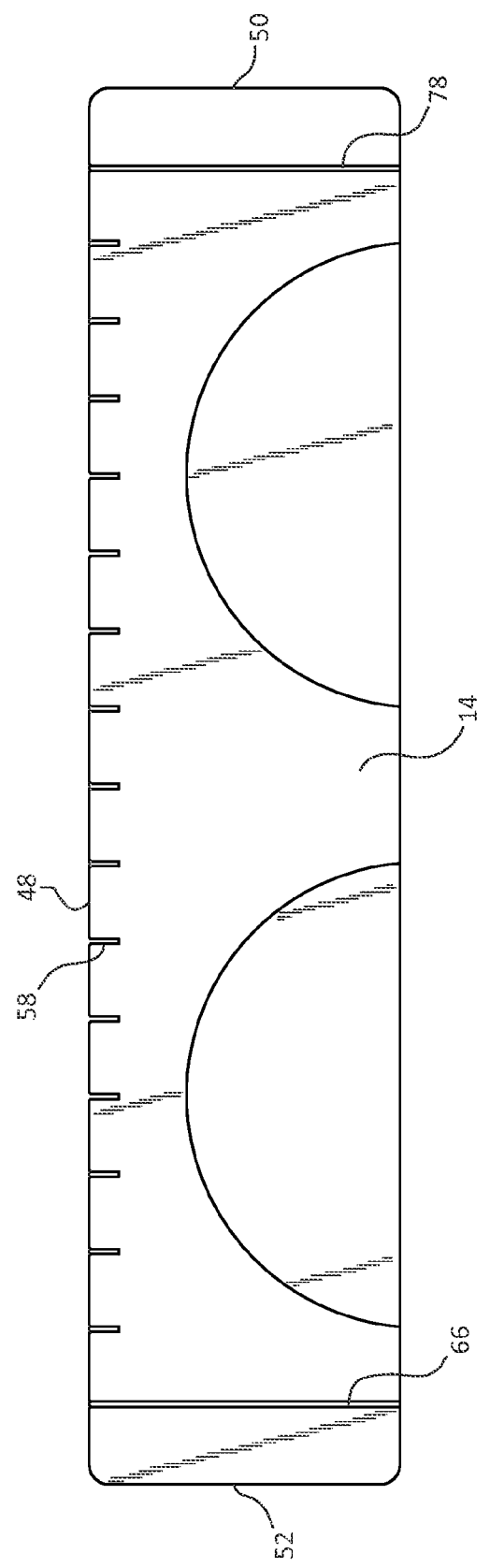
FIG. 3 is a rear view illustration of the portable cooking device of FIG. 1, according to one embodiment of the present invention.
Figure 4:
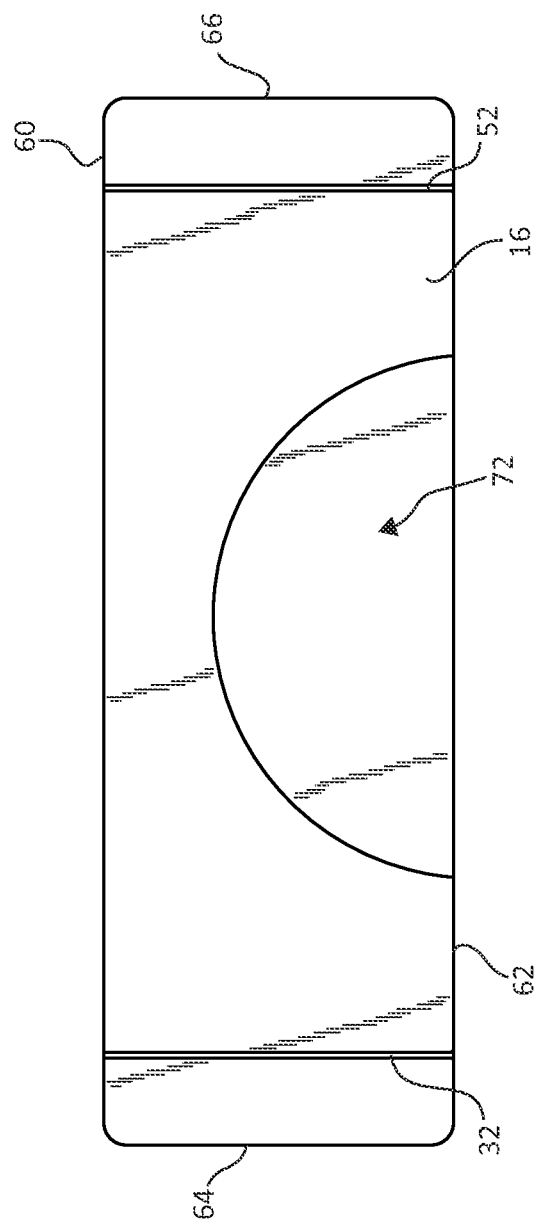
FIG. 4 is a right side view illustration of the portable cooking device of FIG. 1, according to one embodiment of the present invention.
Figure 5:
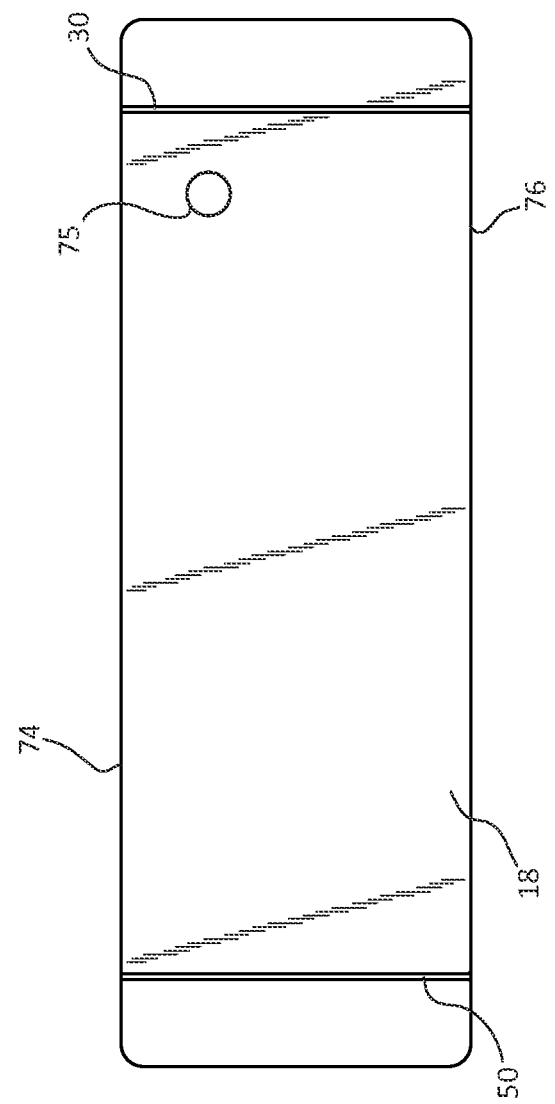
FIG. 5 is a left side view illustration of the portable cooking device of FIG. 1, according to one embodiment of the present invention.
Figure 6:
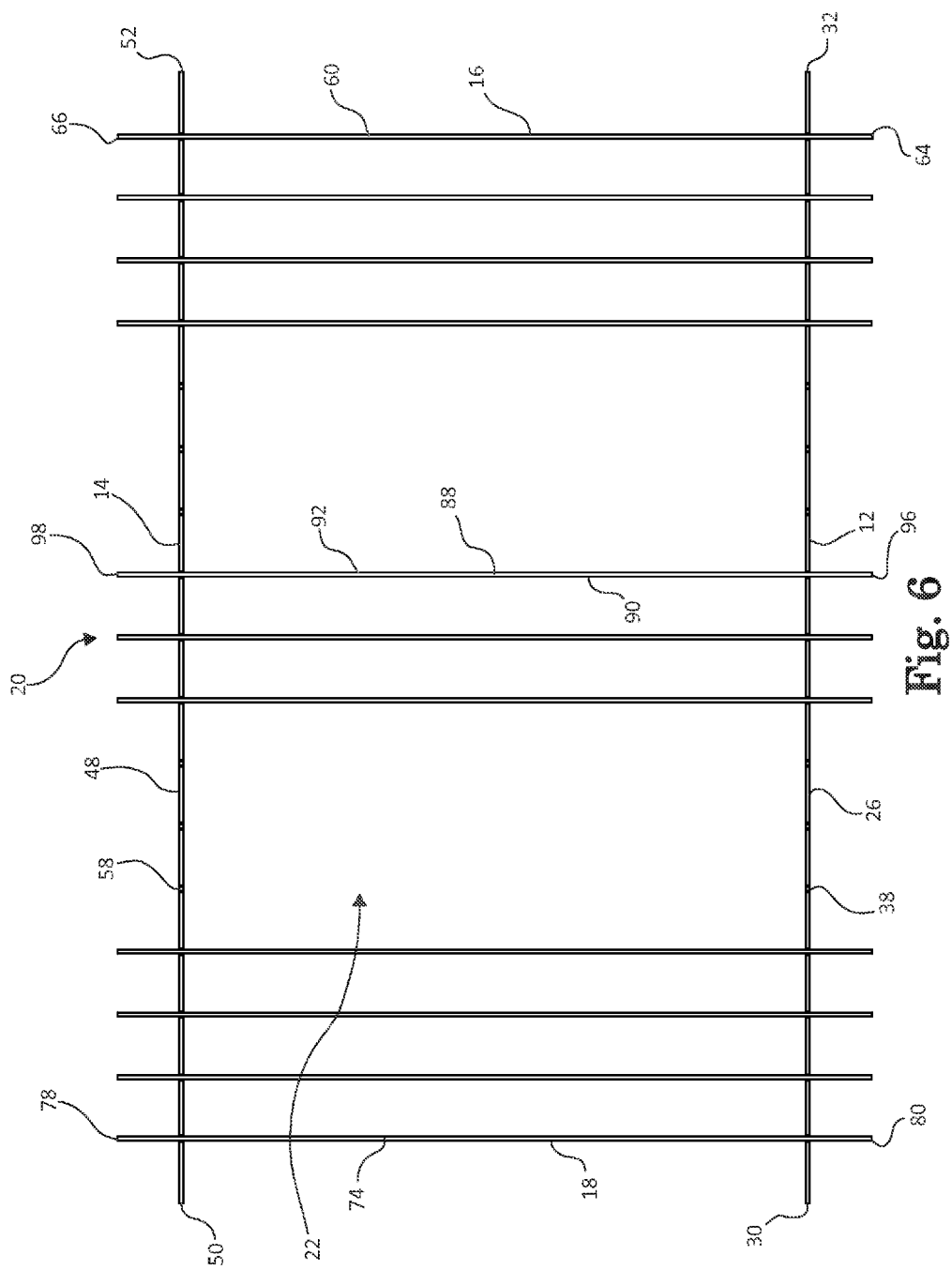
FIG. 6 is a top view illustration of the portable cooking device of FIG. 1, according to one embodiment of the present invention.
Figure 7:
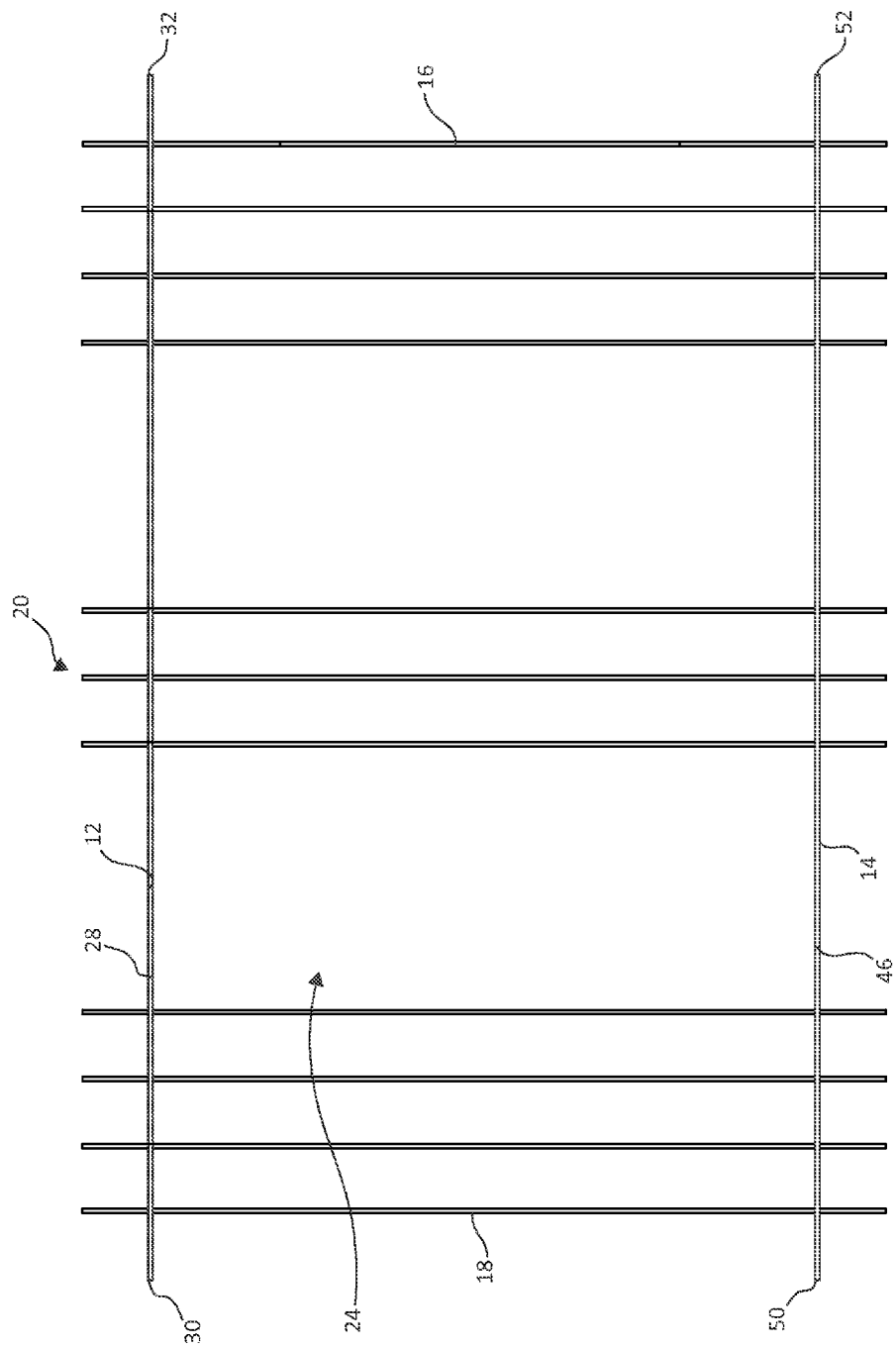
FIG. 7 is a bottom view illustration of the portable cooking device of FIG. 1, according to one embodiment of the present invention.

The following detailed description of the invention provides examples and is not intended to limit the invention or the application and uses of the invention. Furthermore, there is no intention to be bound by any theory presented in the preceding background of the invention or the following detailed description of the invention.

An innovative portable cooking apparatus or grill is provided that is lightweight, portable, and easy and quick to assemble and disassemble. The grill includes four interlocking panels that form a rectangular open top stand to be placed over and thereby surround a heat source. Slats and/or skewers form a top portion of the stand to provide a grilling or support surface. The slats and/or skewers are inserted into slits that are formed in the top edges of the panels to allow the slats to be easily detached from the panels, if desired. Accordingly, placement of the slats can be adjusted from one position to another, depending on a particular configuration of a heat source that is be accommodated.

FIGS. 1-7 are various view illustrations of a portable cooking device 10, according to an embodiment. Portable cooking device or grill 10 includes front and rear panels 12 and 14 (collectively referred to as side panels 12 and 14), right and left panels 16 and 18 (collectively referred to as end panels 16 and 18), and a plurality of rods 20 (otherwise referred to as slats or bars). Front and rear panels 12 and 14 couple to end panels 16 and 18 to form a stand having an open top 22 and open bottom 24. Panels 12, 14, 16, and 18 are formed from materials that are capable of maintaining structural integrity upon prolonged exposure to temperatures suitable for cooking foods, such as raw meats, vegetables, pre-packaged meals or other edible items. For example, panels 12, 14, 16, and 18 are formed from metal or alloy materials, such as aluminum, carbon steel, titanium, and other suitable materials. Rods 20 extend from front side panel 12 to rear side panel 14 over open top 22 and together define a grilling or support surface. Rods 20 comprise materials similar to those from which panels 12, 14, 16, and 18 are formed. In an embodiment, rods 20 are formed from the same materials as panels 12, 14, 16, and 18. In other embodiments, rods 20 and panels 12, 14, 16, and/or 18 are formed from different materials. In any case, each of these components will be described in further detail below.

With additional reference to FIG. 8, front panel 12 is substantially rectangular and has a top edge 26, a bottom edge 28 extending opposite and substantially parallel to top edge 26, and opposing side edges 30 and 32. Although corners joining edges 26, 28, 30, and 32 are rounded, they are sharp or beveled in other embodiments. Top edge 26 includes two slots 34 and 36 and a plurality of slits 38 formed therein. Slots 34 and 36 and slits 38 extend downwardly from and substantially perpendicular relative to top edge 26. Slots 34 and 36 receive end panels 16 and 18, respectively, and thus, each has a width that sufficiently accommodates at least a thickness of the corresponding end panel 16 or 18. Slots 34 and 36 are substantially equal in depth and extend about half of a height of front panel 12. In other embodiments, one of slots 34 or 36 is longer or shorter than the other of slots 34 and 36 and/or is longer or shorter than half the height of front panel 12.

Slits 38 each have a width that accommodates a thickness of a corresponding rod 20. To secure rods 20 to grill 10, each slit 38 has a depth that is substantially equal to or less than a width of a corresponding rod 20 when rod 20 lies substantially horizontally across grill 10. Alternatively, slits 38 are shallower than the width of corresponding rods 20 when rods 20 are laid across grill 10, while still allowing rods 20 to be secured in slits 38 when grill 10 is assembled. In an embodiment, the depths of slits 38 are about half of the width of corresponding rod 20. In another embodiment, slits 38 are substantially equal in depth to one another (as illustrated) or have varying depths. Slits 38 are generally smaller in depth, for example, less than 25% the depth of, slots 34 and 36. Although fifteen total slits 38 are illustrated in the figures, it will be appreciated that more or fewer slits 38 are included in other embodiment. Moreover, although slits 38 are illustrated as being substantially evenly spaced along top edge 26 between slots 34 and 36, slits 38 alternatively may be unevenly spaced. Additional slits 38 (not shown) are formed between side edge 30 and slot 34, and/or side edge 32 and slot 36, in another embodiment.

Turning additionally to FIG. 9, rear panel 14 is substantially similar to front panel 12, except rear panel 14 includes cutouts 42 and 44. For example, rear panel 14 has a bottom edge 46, a top edge 48, opposing side edges 50 and 52, two slots 54 and 56 and a plurality of slits 58 that are substantially similarly configured to top edge 26, side edges 30 and 32, slots 34 and 36, and slits 38. In an embodiment, rear panel 14 is substantially similar in size to front panel 12, having rounded, beveled or sharp corners. Each of slots 54 and 56 and slits 58 of rear panel 14 substantially align with (i.e., are sized, shaped, and positioned substantially identically to) slots 34 and 36 and slits 38 when rear panel 14 is laid over front panel 12. As a result, rods 20 extend substantially parallel with each other when grill 10 is assembled. In another embodiment, slots 54 and 56 and slits 58 are spaced wider or narrower than slots 34 and/or 36 and/or slits 38 and do not align with each other so that rods 20 are not parallel to each other when grill 10 is assembled.

Cutouts 42 and 44 provide access to or venting for a fuel source over which grill 10 is disposed and extend from bottom edge 46 into rear panel 14. Cutouts 42 and 44 are formed opposite slits 58 and between slots 54 and 56. In an embodiment, each cutout 42 and 44 is substantially semi-circular and has a radius that is substantially equal to or greater than about two-thirds of a height of rear panel 14. Thus, an elongated poker, shovel or another accessory can be inserted through cutout 42 or 44 for agitating the fuel source. In alternative embodiments, a radius of one or both cutouts 42 and/or 44 is less than or greater than two-thirds of the height of rear panel 14. In still other embodiments, cutout 42 and/or 44 is rectangular or another shape or more or fewer than two cutouts 42 and 44 are formed along bottom edge 46 of rear panel 14. In one embodiment, one or more cutout 42 and 44 is formed in each of front or rear panels 12 or 14 or one or more cutouts 42 and 44 is formed in front panel 12 instead of rear panel 14.

End panels 16 and 18 extend between front and rear panels 12 and 14 and couple to front and rear panels 12 and 14 to form a closed polygon shape, such as a rectangle. With additional reference to FIG. 10, right panel 16 is substantially rectangular and has a top edge 60, a bottom edge 62, and side edges 64 and 66. Corners joining edges 60, 62, 64, and 66 are rounded, beveled, sharp or another shape. Slots 68 and 70 and cutout 72 are formed along bottom edge 62. Slots 68 and 70 are configured to mate with corresponding slots 34, 36, 54, or 56 of front 12 or rear panels 14. Accordingly, slots 68 and 70 extend upwardly from bottom edge 62 toward top edge 60 to allow one of slots 34, 36, 54, or 56 that extend downwardly from top edges 26 and 48 of front and rear panels 12 and 14 to fit into slot 68 or 70. In this way, when top edge 26 or 48 of front or rear panel 12 or 14 is aligned with top edge 60, a portion of front or rear panel 12 or 14 is maintained within slot 68 or 70. In an embodiment in which top edge 26 or 28 forms a plane with top edge 60 when panels 12 or 14 and 16 are coupled together, slots 68 and 70 preferably are formed substantially perpendicularly relative to bottom edge 62. Although illustrated in the figures as extending about half the height of right panel 16, slots 68 and 70 are longer or shorter in other embodiments.

Cutout 72 is formed by right panel 16 between slots 68 and 70 to provide an opening having a length and height that is greater than a diameter and height of the heat source. Cutout 72 is semicircular or another shape. In one embodiment, more than one cutout 72 or no cutout 72 is defined by right panel 16.

Turning now to FIG. 11, left panel 18 is substantially similarly configured to right panel 16. Specifically, left panel 18 includes a top edge 74, a bottom edge 76, side edges 78 and 80, and slots 82 and 84 along bottom edge 76, formed substantially similarly to top edge 60, bottom edge 62, side edges 64 and 66, and slots 68 and 70 of right panel 16. Thus, when left panel 18 is disposed over right panel 16, slots 68 and 70 align with (i.e., are sized, shaped, and positioned substantially identically to) slots 82 and 84. In this way, end panels 16 and 18 are interchangeable with each other such that slots 82 and 84, which extend upwardly from bottom edge 76 toward top edge 74, similarly allow one of slots 34, 36, 54, or 56 of front and rear panels 12 and 14, and ultimately, front or rear panel 12 or 14, to fit therein. In an alternate embodiment, left panel 18 is formed substantially identically to right panel 16 and also includes one or more cutouts (not shown). In another embodiment, left panel 18 includes a vent hole 75 formed just below top edge 74 to allow air into grill 10 to thereby prevent a fire from choking out when a pan or griddle covers a substantial portion of the grilling surface. Although shown on left panel 18, vent hole 75 is alternatively or additionally formed on right panel 16 in another embodiment.

Returning to FIGS. 1-7, as noted briefly above, rods 20 extend across open top 22. Accordingly, each rod 20 preferably has a length that is greater than a distance between front and rear panels 12 and 14 when grill 10 is assembled. For example, rods 20 are configured such that portions of each extend past slits 38 and 58 when grill 10 is assembled.

According to one embodiment, rods 20 are employed to form the grilling surface over which to place food or cookware. For example, with reference to FIGS. 1, 6, and 12, one or more rods 20 are formed as slats having two opposing major faces 88 and 90 and two substantially parallel longitudinal edges 92 and 94 extend between two opposing ends 96 and 98. Each rod 20 has a thickness measured between major faces 88 and 90 that is less than the width of rod 20 measured between longitudinal edges 92 and 94. As alluded to briefly above, in an embodiment, width of rod 20 is substantially equal to the depth of a corresponding slit 38 or 58 in embodiments in which grill surface is to be defined in substantially the same plane as top edges 26 and 48 of front and rear panels 12 and 14, respectively. In another embodiment in which the grill surface is slightly offset from top edges 26 and 48, the width of each rod 20 is selected to be less than the depth of corresponding slit 38 or 58. One or both of opposing ends 96 and 98 are tapered, in an embodiment. For example, one or both of ends 96 and 98 are rounded and have a semi-circular shape (as shown in FIG. 12) or beveled and pointed.

Rods 20 include suitably spaced apart notches 100, for example, a pair of notches 100, that correspond with slits 38 or 58 to further secure rods 20 in slits 38 or 58. For example, each notch 100 is spaced a distance apart that corresponds to a distance between slots 34 and 36 of front panel 12 or slots 54 and 56 of rear panel 14. Notches 100 provide a gap that is substantially equal to or slightly greater than a thickness of panel 12 or 14 to be disposed therein. Otherwise shaped slats 20, for example, slats 20 with a circular cross-section, are also contemplated.

In another embodiment, as illustrated in FIG. 13, rods 102 are formed similar to rod 20 and includes spaced apart notches 104 similar to notches 100, except instead of including two curved ends, one end 106 is tapered and/or pointed and the other end 108 is rounded. Such an embodiment allows rod 102 to serve as a cross piece for defining a grilling surface or as a support for attaching food directly to rod 102. As shown in FIG. 13, tapered end 106 includes a lower angled wall 110 extending upwardly from a bottom longitudinal edge 112 and meeting an upper angled wall 114 at a tip 116. Upper angled wall 114 extends beyond a top longitudinal edge 118 to form a sharp projection 120, which aids in maintaining food on rod 102 during cooking. Although shown as a slat, rod 102 is cylindrical or otherwise shaped in other embodiments.

Alternatively, as illustrated in FIG. 14, rods 202 are formed as skewers for attaching food directly thereto. In this regard, rod 202 has a length that is greater than the distance between front and rear panels 12 and 14, when grill 10 is assembled. Rod 202 also has a sharp end or tip 204 for easy insertion of rod 202 through the food and a handle end 206. Although illustrated as a closed loop configuration, handle end 206 has a hook configuration or another easy-to-grab design in another embodiment. In one embodiment, different ones of rods 20, 102, and 202 may be simultaneously used with the skewer.

Figure 15:
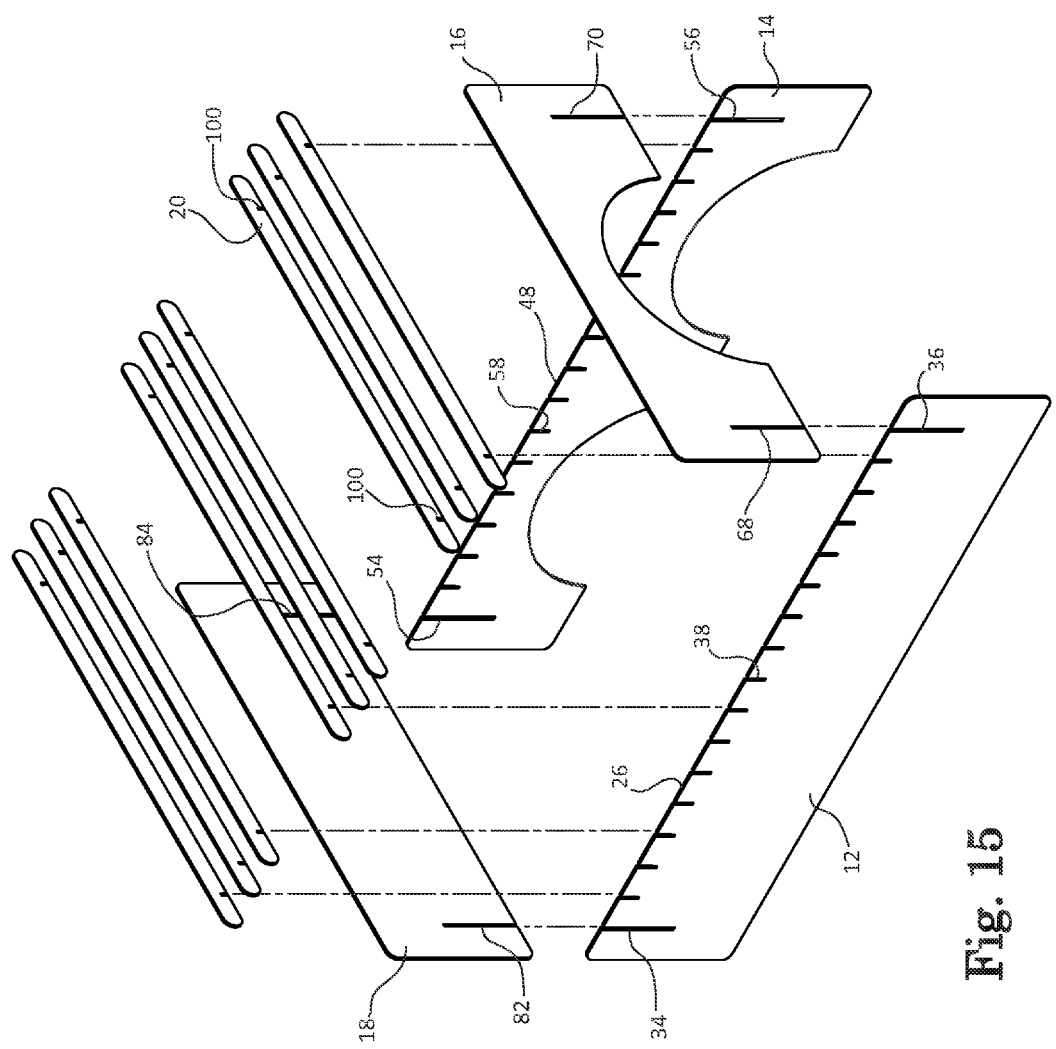
FIG. 15 is an exploded perspective view illustration of the portable cooking device of FIG. 1, according to one embodiment of the present invention.
Figure 16:
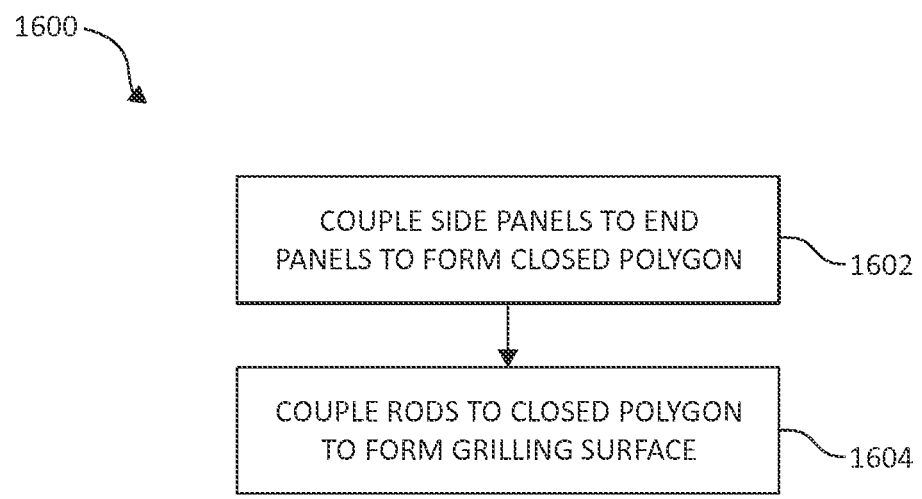
FIG. 16 is a flow diagram of a method of assembling the portable cooking device of FIG. 1, according to one embodiment of the present invention.

Turning now to FIGS. 15 and 16, a method 1600 of assembling grill 10 will now be described. In an embodiment, side panels 12 and 14 are coupled to end panels 16 and 18 to form a closed polygon, at 1602. In one of many examples, left panel 18 is positioned over front panel 12 such that slot 34 of front panel 12 is aligned with slot 82 of left panel 18. After slots 34 and 82 are properly aligned, left panel 18 and front panel 12 are slid toward each other until a portion of left panel 18 is retained in slot 34 of front panel 12 and a portion of front panel 12 is retained in slot 82 of left panel forming an L-shape piece. Rear panel 14 is positioned below left panel 18 such that slot 84 of left panel 16 is aligned with slot 54 of rear panel 14. Left panel 18 and rear panel 14 are slid toward each other until a portion of left panel 18 is retained in slot 54 of rear panel 14 and a portion of rear panel 14 is retained in slot 84 of left panel 16 to form a 3-sided U-shaped piece. Next, right panel 16 is positioned over front panel 12 and rear panel 14 such that slots 68 and 70 are aligned with slot 36 of front panel 12 and slot 56 of rear panel 14, respectively. Right panel 16 is slid relative to front and rear panels 12 and 14 until portions of right panel 16 are retained in slots 36 and 56 of front and rear panels 12 and 14, respectively, a portion of front panel 12 is retained in slot 68 of right panel, and a portion of rear panel 14 is retained in slot 70 of right panel 16 to form the closed polygon. In an embodiment in which front panel 12 and rear panel 14 are substantially parallel to each other and right panel 16 and left panel 18 are disposed substantially orthogonal to front and rear panels 12 and 14, panels 12, 14, 16, and 18 form a rectangle. Alternatively, panels 12 and 14 are not orthogonal to panels 16 and 18 to thereby form a parallelogram or another shape.

Figure 17:
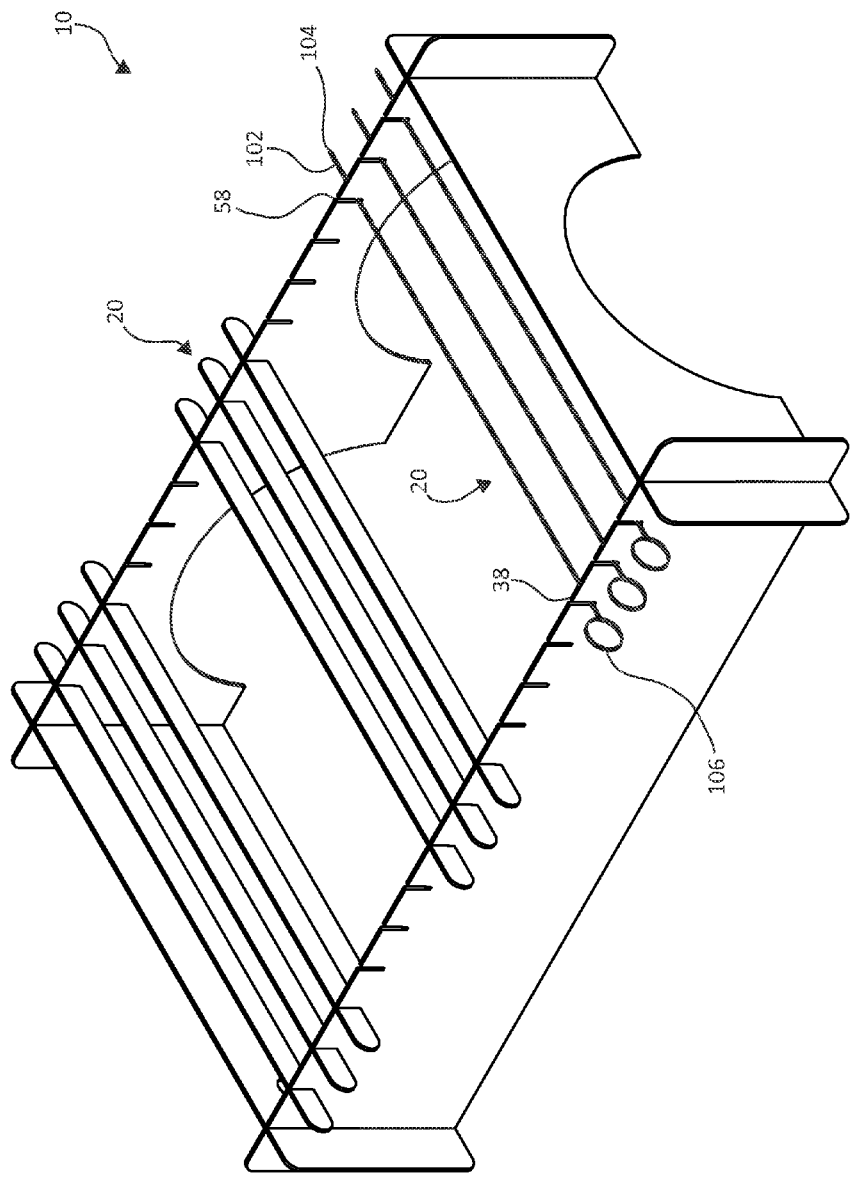
FIG. 17 is a front, perspective view illustration of a portable cooking device including slats and skewers, according to one embodiment of the present invention.

Rods 20, 102, and/or 202 are coupled to the closed polygon to form a grilling surface, at 1604. Rods 20, 102, or 202 are positioned across top edges 26 and 48 of front and rear panels 12 and 14, respectively. In an embodiment, notches 100 on rods 20 or 102 are aligned over one of slits 38 of front panel 12 and one of slits 58 of rear panel 14. Rod 20 or 102 is slid into panels 12 and 14 to secure rod 20 or 102 thereto. In an embodiment in which rods are configured to be skewers, as illustrated in FIG. 17, rods 202 are positioned in slits 38 and 58 such that handle end 106 extends away from closest slit 38 or 58 and sharp end 204 extends away from the other of slit 38 or 58. Operation 2704 is repeated until a desired number of rods 20, 102, and/or 202 is attached to front and rear panels 12 and 14 and the grilling surface is formed to thereby yield an assembled grill 10.

Figure 18:
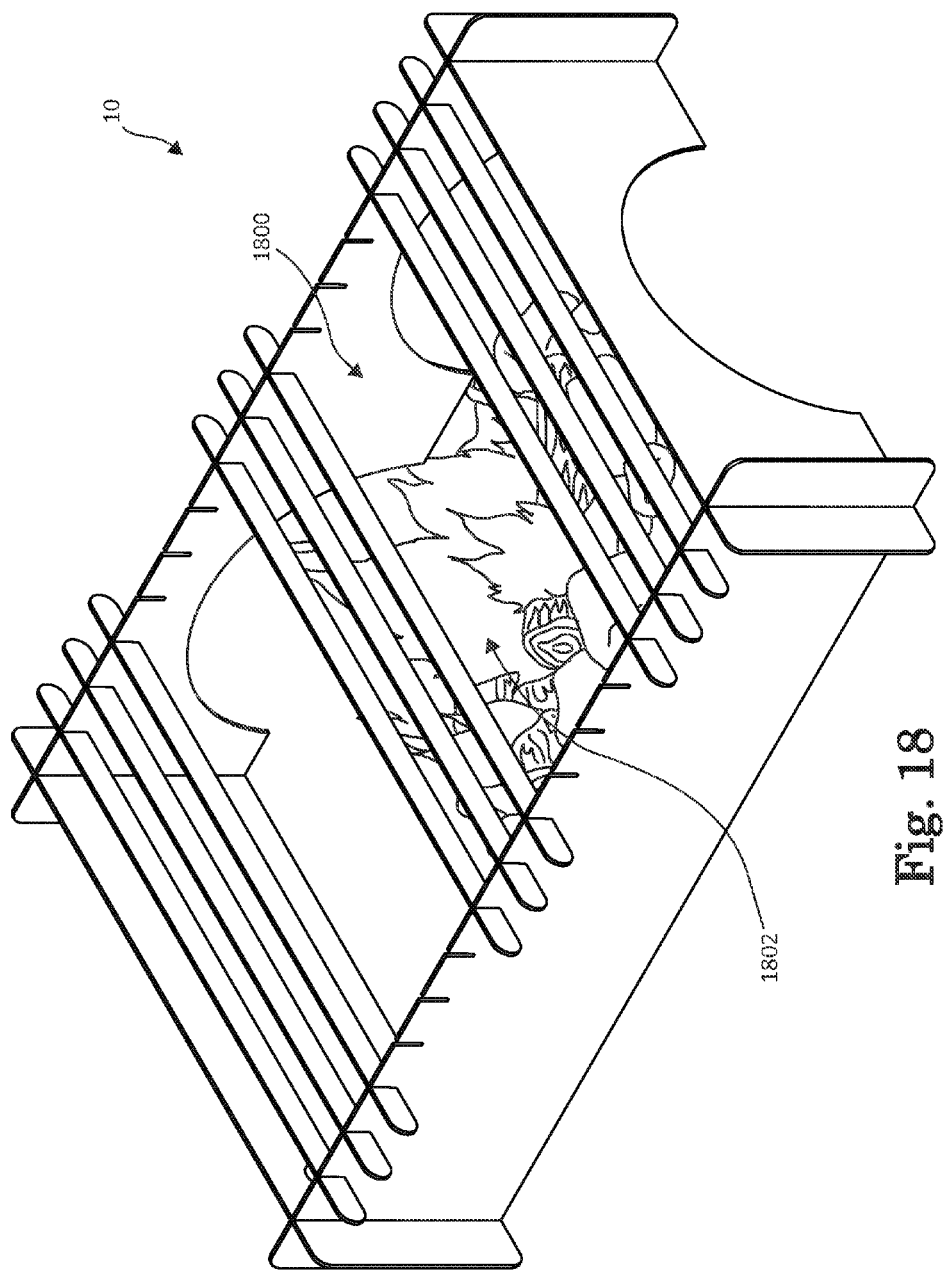
FIG. 18 is a front, perspective view illustration of a portable cooking device including slats and disposed over a fire, according to one embodiment of the present invention.
Figure 19:
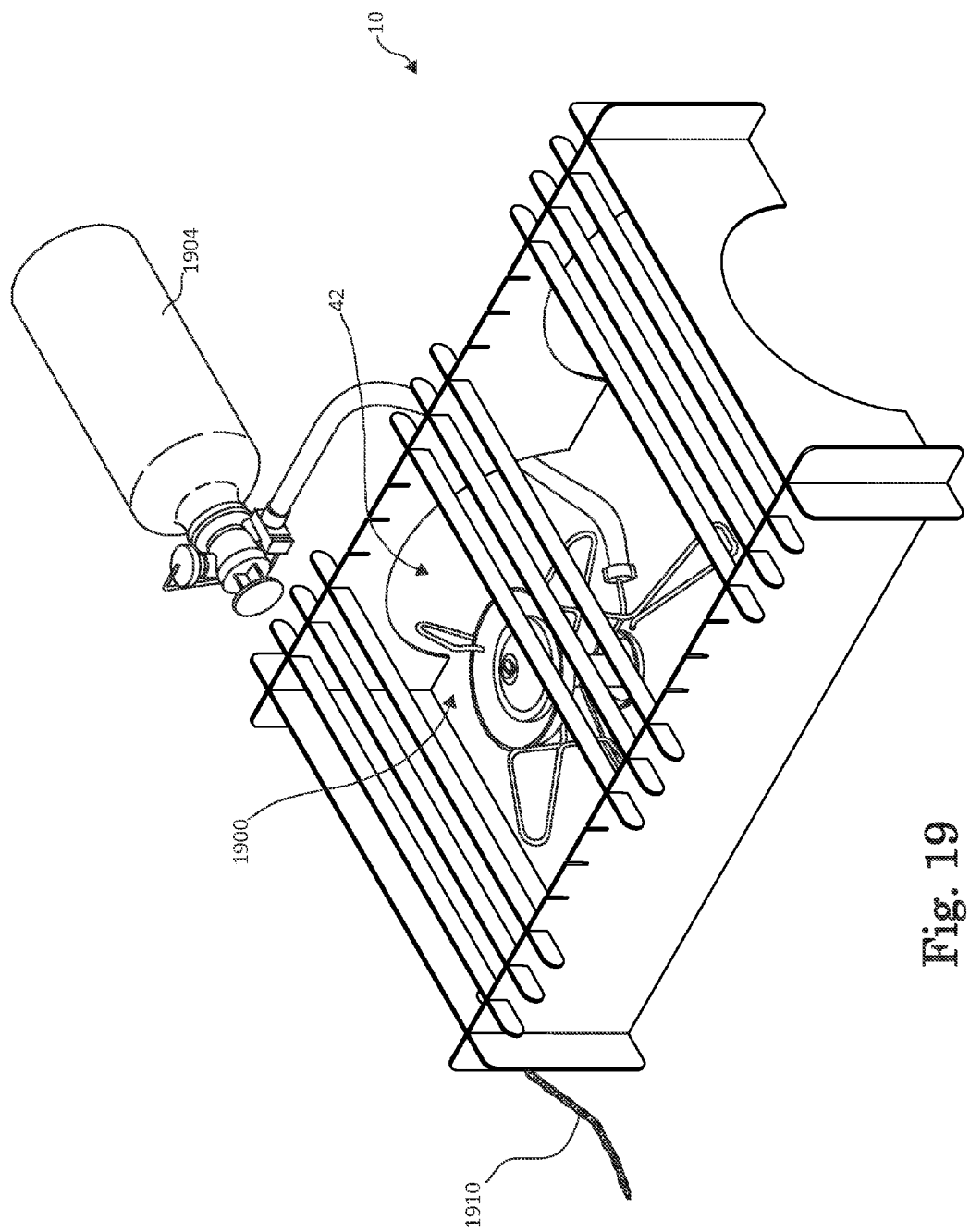
FIG. 19 is a front, perspective view illustration of a portable cooking device including slats and a fuel assembly, according to one embodiment of the present invention.

With additional reference to FIGS. 18 and 19, grill 10 is placed over a fuel source, such as a fire 1802 made with wood or logs 1800 (illustrated in FIG. 18) or a portable gas source 1900 (illustration in FIG. 19). In one embodiment, fire bricks (not shown) are used to improve energy efficiency during grilling. In such case, the fire bricks are arranged in a desired configuration on a surface, such as on the ground, and the wood or logs 1800 or portable gas source 1900 are placed over the fire bricks prior to grill operation. During operation, the fuel source is ignited to produce heat, such as fire 1902. As depicted in FIG. 19, a portion of fuel source, such as gas tank 1904 can extend outside of grill 10 through cutout 42 so that a user can adjust a flame of grill 10. After use, fuel source is removed from grill 10 or vice versa. For example, tether 1910 is used to drag or otherwise move grill 10 from a first location surrounding the fuel source to a second location away from the fuel source. Tether 1910 is a length of material, such as a chain, leather strap, or the like, that is temporarily or permanently coupled to one or more of panels 12, 14, 16, or 18. Although shown in FIG. 19 as being attached to particular panels 12, 14, 16, and/or 18, tether 1910 is coupled to a different panel 12, 14, or 16 in other embodiments. In instances in which the fuel source continues to provide heat, grill 10 is led across a surface via tether 1910 such that cutout 72 is dragged over fuel source to thereby remove grill 10 from heat source.

FIGS. 20-25 are various views of a portable cooking device 2000, according to another embodiment. Portable cooking device or grill 2000 is configured substantially similar to grill 10 of FIGS. 1-7. Grill 2000 includes front and rear panels 2012 and 2014 (collectively referred to as side panels 2012 and 2014), right and left panels 2016 and 2018 (collectively referred to as end panels 2016 and 2018), a plurality of rods 2020, and a plurality of large and small crosspieces 2021 and 2041.

Figure 23:
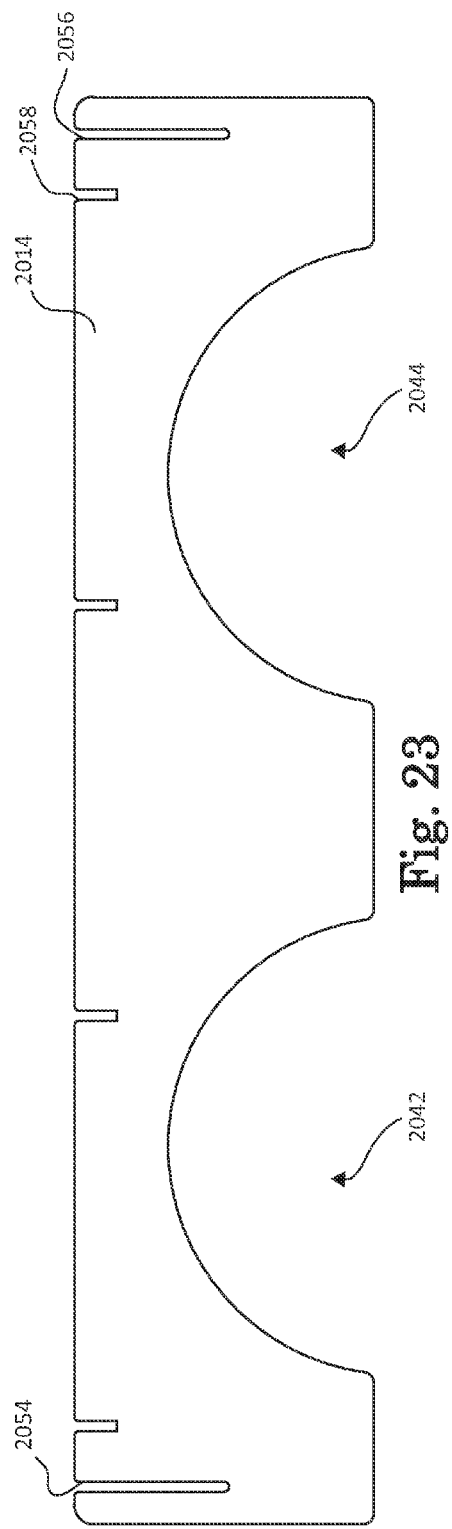
FIG. 23 is front view illustration of a rear panel of the portable cooking device of FIG. 20, according to one embodiment of the present invention.
Figure 24:
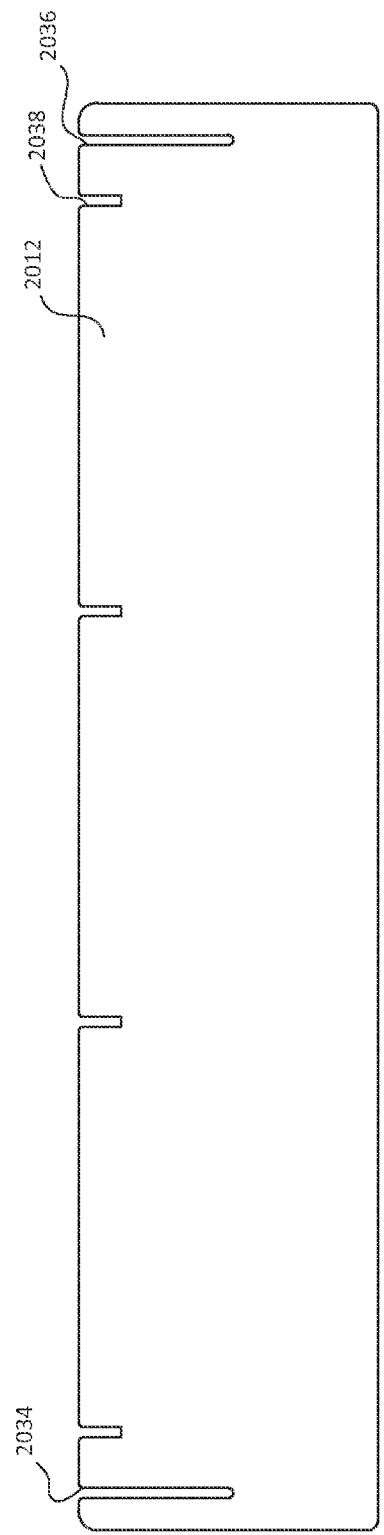
FIG. 24 is front view illustration of a front panel of the portable cooking device of FIG. 20, according to one embodiment of the present invention.

End panels 2016 and 2018 are formed substantially similar to end panels 16 and 18 (as illustrated in FIGS. 21 and 22). In particular, end panel 2016 includes slots 2068 and 2070 and cutout 2072 similar to slots 68 and 70 and cutout 72 of end panel 16, and end panel 2018 includes slots 2082 and 2084 similar to slots 82 and 84 of end panel 18. Side panels 2012 and 2014 are formed substantially similar to side panels 12 and 14 (as illustrated in FIGS. 22 and 23). In particular, side panel 2012 includes slots 2034 and 2036 and slits 2038, except side panel 2012 includes fewer slits 2038, than side panel 12. Side panel 2014 includes slots 2034 and 2036 and slits 2058 similar to those of side panel 14, except, in one embodiment, side panel 2014 has fewer slits 2058. For example, four slits 2038 and 2058 are shown in FIGS. 22 and 23. In other embodiments, more or fewer than four slits 1938 are included on each side panel 2012 and/or 2014.

With additional reference to FIG. 25, rods 2020 are configured substantially similar to rods 20, except that rods 2020 include a plurality of indentations 2023 formed along their lengths. In an embodiment, indentations 2023 extend from a first longitudinal edge 2027 toward a second longitudinal edge 2029 and are substantially equally spaced along rods 1920 between notches 2025, which extend from second longitudinal edge 2029 toward first longitudinal edge 2027. Notches 2025 are configured to be inserted into slits 2038 and 2058 of side panels 12 and 14. Indentations 2023 are used to temporarily couple large crosspieces 2021 to rods 2020. Large crosspieces 2021 each include slits 2031 formed on a longitudinal edge 2033 adjacent to each end 2035 and 2037 of large crosspiece 2021. Slit 2031 adjacent end 2035 of large crosspiece 2021 engages with indentation 2023 of one rod 2020, and slit 2031 adjacent end 2037 of large crosspiece 2021 engages with indentation 2023 of another rod 2020. By including rods 2020 and large crosspieces 2021, a larger grilling surface is provided. Moreover, though not shown, rods 20 and/or 102 and/or skewers 202 are used in conjunction with rods 2020 to provide a variety of options for attaching or supporting food on grill 2000. Small crosspieces 2041 are used to form smaller grilling surfaces for heating and/or cooking more delicate foods, such as fish and/or to otherwise increase the flexibility of the portable cooking device 2000. In one embodiment, each small crosspiece extends between two large crosspieces 2021 and includes two or more spaced apart notches 2045. In one example, notches 2045 are sufficiently wide to engage with a portion of a corresponding large crosspiece such that a flat cooking surface is maintained across the tops of small crosspieces 2041 and large crosspieces 2021.

Figure 20:
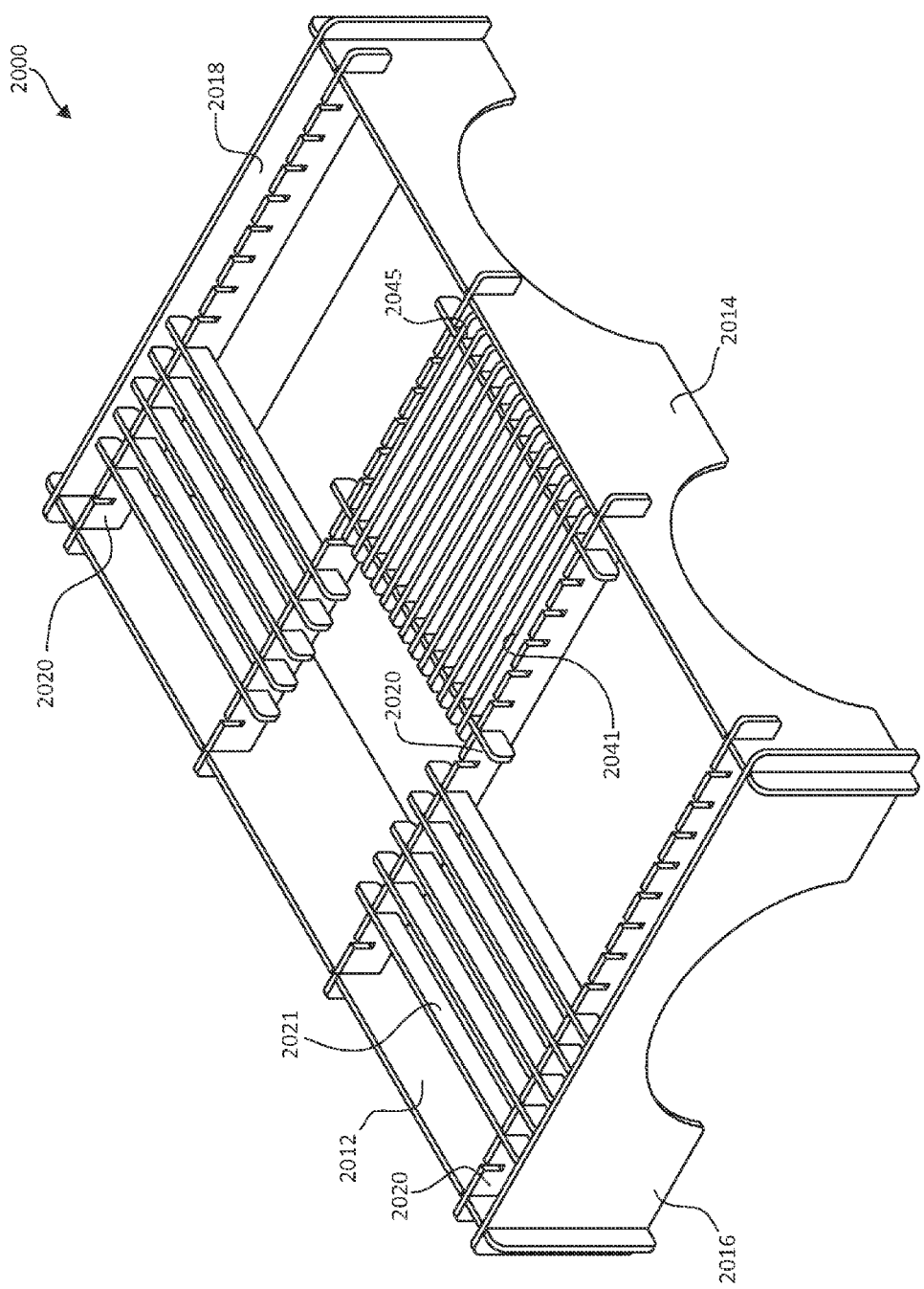
FIG. 20 is a rear, perspective view illustration of a portable cooking device, according to another embodiment of the present invention.

With additional reference to FIGS. 16 and 20, grill 2000 is assembled according to method 1600. For example, panels 2012, 2014, 2016, and 2018 are assembled to thereby form a closed polygon, at step 1602, and rods 2020 are coupled to the closed polygon, at step 1604. To provide the additional, larger grilling surface, crosspieces 2021 are optimally placed such that they extend between two adjacent rods 2020. In one embodiment, a first set of crosspieces 2021 extends between a first pair of adjacent rods 202 closer to front panel 2012, a second set of crosspieces 2021 extends between a second pair of adjacent rods 202 and is positioned closer to rear panel 2014, while a third set of crosspieces 2021 extends between a third pair of adjacent rods 202 closer to front panel 2012. As a result, three grilling surfaces are provided. In other embodiments, more or fewer grilling surfaces are included by adding or omitting one or more of the crosspieces 2021.

Figure 27:
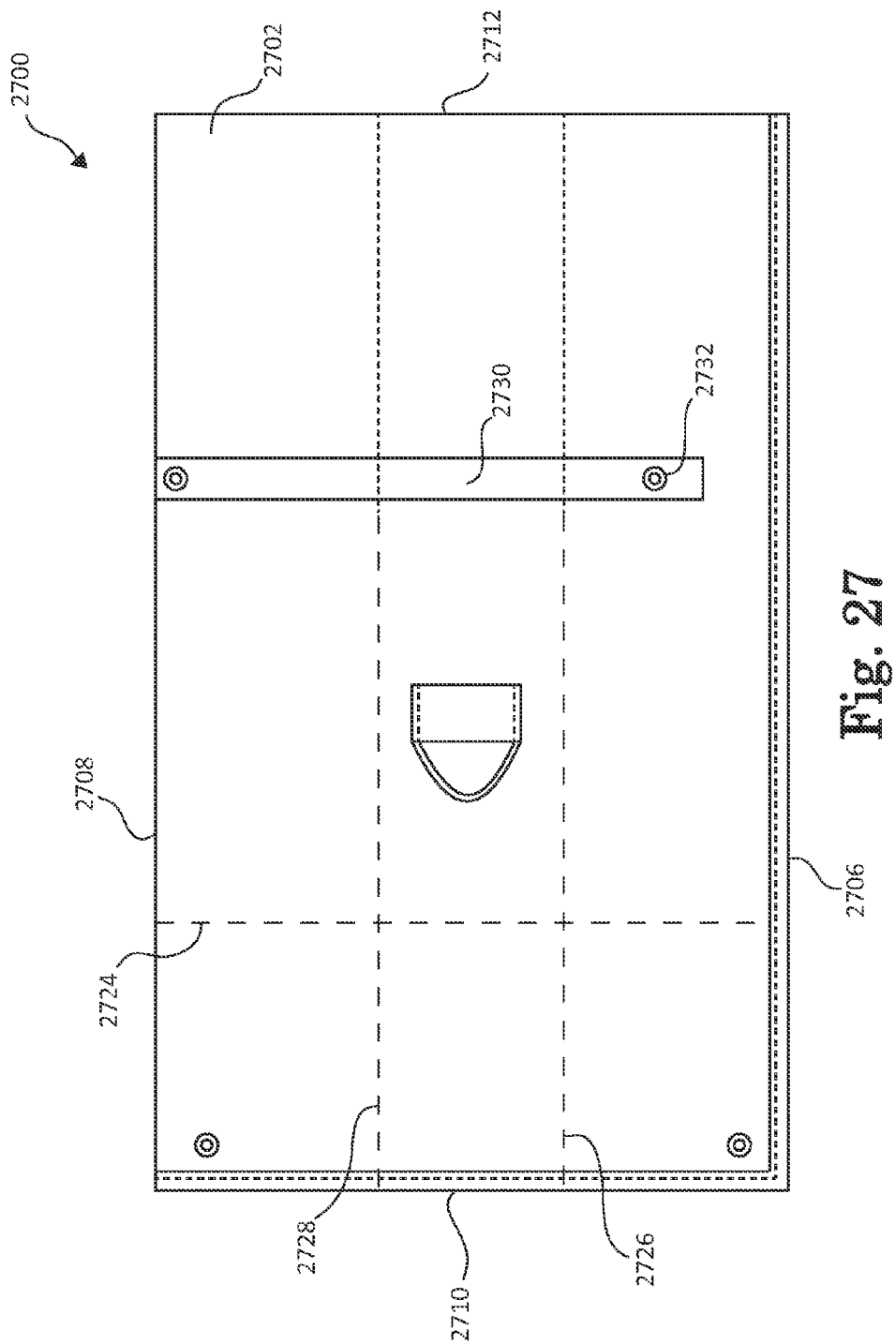
FIG. 27 is a top view illustration of a carrying case for the portable cooking device of FIG. 1 in an open configuration according to one embodiment of the present invention.
Figure 28:
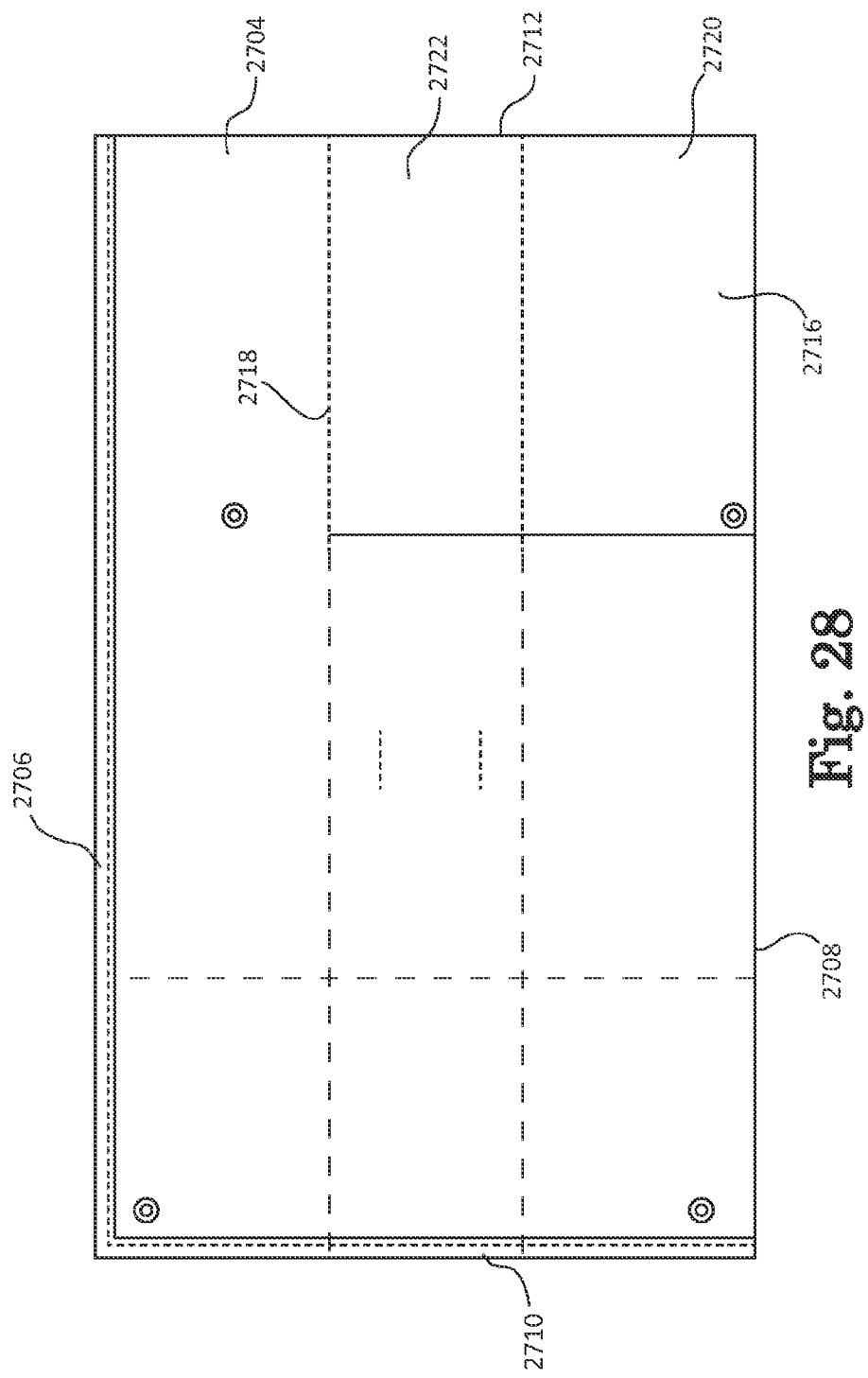
FIG. 28 is a bottom view illustration of the carrying case of FIG. 27 in the open configuration, according to one embodiment of the present invention.

When grill 10 or 2000 is not being used, grill 10 or 2000 can be disassembled and stored in a case. FIGS. 27-29 illustrate various views of a case 2700 for carrying disassembled grill 10. Case 2700, when in an open configuration, is generally rectangular and includes a top or exterior side 2602, a bottom or interior side 2704, reinforced longitudinal edge 2706, free longitudinal edge 2708, reinforced lateral edge 2710, and free lateral edge 2712. Case 2700 is formed from a flexible material capable of being folded, such as a plastic, cloth, or another type of material.

Interior side 2704 includes a flap portion 2716 that is attached thereto. In particular, flap portion 2716 is formed from material that extends from free longitudinal edge 2708 and lays over interior side 2704 surface. Flap portion 2716 extends about two-thirds of a distance from longitudinal edge 2706 to longitudinal edge 2708 and a free longitudinal edge 2718 of flap portion 2716 is attached to interior side 2704. In an example, free longitudinal edge 2614 of flap portion 2716 is aligned substantially parallel to free longitudinal edge 2708 of case 2700 and edge 2614 and case 2700 are sewn together. Two pockets 2720 and 2722 for retaining panels 12, 14, 16, and 18, and rods 20 can be included by sewing a middle section of flap portion 2716 to case 2700.

If desired, case 2700 can be folded up into a closed configuration to occupy a smaller footprint. For example, a portion of case 2700 is folded over along fold line 2724, which extends substantially parallel to reinforced lateral edge 2710, and case 2700 can be folded into thirds along fold lines 2726 and 2728, each extending substantially parallel to longitudinal edges 2706 and 2708. When case 2700 is folded, portions of exterior side 2602 remain exposed.

Exterior side 2602 includes a tassel 2730 for maintaining case 2700 in the closed configuration. One end of tassel 2730 is attached to exterior side 2702 of case 2700 via a portion or a snap closure 2732, and a free end of tassel 2730 includes a corresponding portion of snap closure 2732. When case 2700 is folded, tassel 2730 is wrapped around an outer perimeter of case 2700 and snap closure 2732 is snapped together, as shown in FIG. 29. Other cases or holders are also contemplated.

Although the invention has been described with respect to particular embodiments, such embodiments are meant for illustrative purposes only and should not be considered to limit the invention. Various alternatives and changes will be apparent to those of ordinary skill in the art. Other modifications within the scope of the invention and its various embodiments will be apparent to those of ordinary skill.

What is claimed is:

1. A portable cooking apparatus comprising:
   a plurality of panels temporarily coupled to each other, wherein:
   each panel includes a top edge and a bottom edge opposite the top edge,
   at least two of the plurality of panels each include a plurality of slits, and
   each slit of the plurality of slits extends from the top edge of a corresponding panel of the plurality of panels toward a bottom edge thereof; and
   a plurality of rods removably extending between two panels of the plurality of panels, each rod of the plurality of rods being inserted into a first slit of the plurality of slits formed in one of the two panels and a second slit of the plurality of slits formed in another of the two panels, each of the plurality of rods is a flat, planar slat having at least one tapered end and includes two notches along its length, and the two notches are spaced apart from each other to correspond to a distance between the first slit and the second slit when the plurality of panels are coupled to each other;
   wherein:
   at least one tapered end tapers to terminate in a point at an outermost extremity of the at least one tapered end,
   the at least one rod defines a first longitudinal edge, a second longitudinal edge opposite the first longitudinal edge, and a projection near the tapered end extending beyond the first longitudinal edge, and
   the tapering of the tapered end is continuous and linear from the point to an extremity of the projection opposite the point.

2. The apparatus of claim 1, wherein:
   the plurality of panels includes two opposing end panels and two opposing side panels extending between the two opposing end panels.

3. The apparatus of claim 2, wherein:
   each end panel of the two opposing end panels includes a first slot and a second slot extending from one of the top edge and the bottom edge of the respective end panel toward the other of the top edge and the bottom edge of the respective end panel,
   each side panel includes a third slot and fourth slot extending from one of the bottom edge and the top edge of the respective side panel toward the other of the bottom edge and the top edge of the respective side panel,
   the first slot of one of the two opposing end panels engages with one of the third and fourth slots of one of the two opposing side panels, and
   the second slot of the one of the two opposing end panels engages with one of the third and fourth slots of another of the two opposing side panels.

4. The apparatus of claim 3, wherein each rod extends above the top edges of the two opposing side panels.

5. The apparatus of claim 1, wherein at least one of the plurality of rods comprises a skewer.

6. The apparatus of claim 1, further comprising a tether, wherein at least one of the plurality of panels is coupled to the tether, and the tether is configured to be pulled for repositioning the portable cooking apparatus on a support surface.

7. The apparatus of claim 1, wherein a cavity is formed between the plurality of panels, each one of the plurality of panels defines an overall height measured between the top edge and the bottom edge of the corresponding one of the plurality of panels, the overall heights of all of the plurality of panels are identical, the plurality of panels includes two opposing side panels, and at least one of the two opposing side panels includes a cutout extending upwardly from its bottom edge to provide access to the cavity, the cutout has a cutout height greater than a slit height of each of the plurality of slits and equal to or greater than two-thirds of each of the overall heights such that a top edge of the cutout is positioned closer to the bottom edge than bottom ends of the first slit and the second slit are positioned relative to the bottom edge, and the cutout has a cutout width equal to twice the cutout height.

8. The apparatus of claim 1, wherein:
   the portable cooking apparatus has a use configuration and a non-use configuration and is adapted to readily transition from the use configuration to the non-use configuration,
   when the portable cooking apparatus is in the use configuration, the plurality of panels slide together coupling the plurality of panels to one another to form a cavity therebetween and the plurality of rods are coupled to and extend between the two panels of the plurality of panels, and
   when the portable cooking apparatus is in the non-use configuration, all of the plurality of panels are uncoupled from one another and the plurality of rods are all uncoupled from all of the plurality of panels.

9. The apparatus of claim 8, in combination with a storage pack formed entirely separate from the portable cooking apparatus, wherein when the portable cooking apparatus is in the non-use configuration, all of the plurality of panels and the plurality of rods are placed in a stack and secured within the storage pack.

10. The apparatus of claim 1, further comprising:
    a crosspiece extending between two rods of the plurality of rods such that the crosspiece is supported solely by the two rods and is characterized by a lack of interaction with any of the plurality of panels.

11. The apparatus of claim 10, wherein:
    each of the two rods has a plurality of indentations; and
    the crosspiece is inserted into a first indentation of the plurality of indentations of one of the two rods and a second indentation of the plurality of indentations of the other of the two rods.

12. The apparatus of claim 11, wherein each indentation of the plurality of indentations has a depth that is equal to a height of the crosspiece.

13. A portable grill kit comprising:
- a first pair of panels each including a first longitudinal edge, a second longitudinal edge opposite the first longitudinal edge, two slots extending from the first longitudinal edge toward the second longitudinal edge, and a plurality of slits extending from the first longitudinal edge toward the second longitudinal edge;
- a second pair of panels each including a third longitudinal edge, a fourth longitudinal edge opposite the third longitudinal edge, and two slots extending from the third longitudinal edge toward the fourth longitudinal edge, wherein each of the two slots are configured to slidably receive a thickness of one of the first pair of panels to couple one of the second pair of panels to the one of the first pair of panels; and
- a plurality of rods each configured to be inserted into one slit of one of the first pair of panels and another slit of another of the first pair of panels, wherein each of the plurality of rods is planar and defines a top longitudinal edge, the top longitudinal edges of the plurality of rods collectively defining a cooking surface, and each of the plurality of rods is planar and terminates in a point at one or more opposing ends and at an outermost extremity thereof to facilitate placing each of the plurality of rods through a food item to be grilled;

wherein:
- each of the plurality of rods defines a projection extending above the top longitudinal edge and being positioned near to, but spaced from the point, and
- each of the plurality of rods tapers continuously and in a linear manner from the point to an extremity of the projection opposite the point.

14. The portable grill kit of claim 13, further comprising a case including one or more pockets configured to contain the first pair of panels, the second pair of panels, and the plurality of rods.

15. The portable grill kit of claim 14, wherein:
one of the second pair of panels includes a first cutout formed along a corresponding fourth longitudinal edge.

16. The portable grill kit of claim 15, wherein:
one of the first pair of panels includes a second cutout extending along a corresponding second longitudinal edge.

17. The portable grill kit of claim 13, wherein at least two of the plurality of rods have lengths including a plurality of indentations, and the kit further comprises one or more crosspieces configured to be inserted into a first indentation of the plurality of indentations of one of the at least two of the plurality of rods and a second indentation of the plurality of indentations of the other of the at least two rods of the plurality of rods, such that each crosspiece is supported solely by the at one of the at least two of the plurality of rods and the other of the at least two of the plurality of rods and is characterized by a lack of interaction with any of the first pair of panels and the second pair of panels.

18. A portable cooking apparatus comprising:
a pair of opposing side panels each including:
- a top edge,
- a bottom edge,
- two slots extending from one of the top edge and the bottom edge toward the other of the top edge and the bottom edge of the respective one of the pair of opposing side panels, and
- a plurality of slits extending from the top edge toward the bottom edge of the respective one of the pair of opposing side panels;

a pair of opposing end panels including:
- a top edge,
- a bottom edge,
- two slots extending from one of the top edge and the bottom edge of the respective one of the pair of opposing end panels toward another of the top edge and the bottom edge of the respective one of the pair of opposing end panels for receiving corresponding portions of the pair of opposing side panels,
- wherein the pair of opposing side panels are each temporarily coupled to the pair of opposing end panels such that each of the two slots of the pair of opposing end panels receives a thickness of a different one of the pair of opposing side panels and each of the two slots of the pair of opposing side panels receives a thickness of a different one of the pair of opposing end panels; and a plurality of rods each inserted into one slit of the plurality of slits formed in each of the pair of opposing side panels such that each of the plurality of rods extends between the pair of opposing side panels, wherein:
- each of the plurality of rods is flat and defines a first longitudinal edge, a second longitudinal edge opposite the first longitudinal edge, a tapered end, and a projection near the tapered end and extending beyond the first longitudinal edge,
- the tapered end terminates in a point at an outermost extremity of the tapered end, and
- the tapering of the tapered end is continuous and linear from the point to an extremity of the projection opposite the point.

19. The portable cooking apparatus of claim 18, wherein:
each of the plurality of rods has a length including a plurality of indentations; and
the apparatus further comprises a crosspiece extending between a pair of rods of the plurality of rods from a first indentation formed in a first rod of the pair of rods to a second indentation formed in a second rod of the pair of rods.

20. The portable cooking apparatus of claim 18, wherein the crosspiece is one of a plurality of crosspieces each extending between the pair of rods of the plurality of rods.

21. The apparatus of claim 7, wherein at least two of the plurality of panels other than the one of the plurality of panels are solid between the top edge and the bottom edge other than the plurality of slits and slots formed in each of the plurality of panels for coupling the panels to one another, and each of the plurality of panels.

22. The apparatus of claim 7, wherein each of the plurality of slits has a bottommost edge entirely maintained above a topmost edge of the cutout.

23. The apparatus of claim 1, wherein each slit of the plurality of slits extends from the top edge of a corresponding one of the plurality of panels toward the bottom edge of the corresponding one of the plurality of panels, and each slit of the plurality of slits extends from the top edge of the corresponding one of the plurality of panels a distance less than 12.5% of an overall height of the corresponding one of the plurality of panels as measured between the top edges and the bottom edge of the corresponding one of the plurality of panels.

24. The apparatus of claim 1, wherein the two notches each extend from a bottom edge of each of the plurality of rods, the two notches are the only notches extending from the bottom edge of each of the plurality of rods, and the bottom edge of each of the plurality of rods is entirely linear other than the two notches extending from the bottom edge of each of the plurality of rods.

* * * * *